(12) United States Patent
Koyama et al.

(10) Patent No.: US 12,286,562 B2
(45) Date of Patent: Apr. 29, 2025

(54) METAL OXIDE PARTICLES CONTAINING TITANIUM OXIDE COATED WITH SILICON DIOXIDE-STANNIC OXIDE COMPLEX OXIDE

(71) Applicant: NISSAN CHEMICAL INDUSTRIES, LTD., Tokyo (JP)

(72) Inventors: Yoshinari Koyama, Sodegaura (JP); Tomoki Furukawa, Sodegaura (JP); Motoko Asada, Sodegaura (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/574,966

(22) Filed: Jan. 13, 2022

(65) Prior Publication Data

US 2022/0135814 A1    May 5, 2022

Related U.S. Application Data

(62) Division of application No. 14/122,928, filed as application No. PCT/JP2012/064296 on Jun. 1, 2012, now abandoned.

(30) Foreign Application Priority Data

Jun. 3, 2011   (JP) .................................. 2011-125259

(51) Int. Cl.
| | |
|---|---|
| C09D 7/62 | (2018.01) |
| B82Y 30/00 | (2011.01) |
| C01G 23/047 | (2006.01) |
| C01G 23/053 | (2006.01) |
| C08G 18/08 | (2006.01) |
| C09C 1/36 | (2006.01) |
| C09D 5/00 | (2006.01) |
| C09D 7/40 | (2018.01) |
| C09D 175/04 | (2006.01) |

(52) U.S. Cl.
CPC ............... *C09D 7/62* (2018.01); *B82Y 30/00* (2013.01); *C01G 23/047* (2013.01); *C08G 18/0866* (2013.01); *C09C 1/3661* (2013.01); *C09D 5/00* (2013.01); *C09D 7/67* (2018.01); *C09D 175/04* (2013.01); *C01G 23/053* (2013.01); *C01P 2004/64* (2013.01); *C01P 2004/84* (2013.01); *C01P 2006/22* (2013.01); *Y10T 428/31663* (2015.04)

(58) Field of Classification Search
None
See application file for complete search history.

(56) References Cited

U.S. PATENT DOCUMENTS

| 6,296,943 B1 | 10/2001 | Watanabe et al. |
| 2004/0086724 A1 | 5/2004 | Suzuki et al. |
| 2008/0241544 A1 | 10/2008 | Tadakuma et al. |
| 2008/0268253 A1* | 10/2008 | Murai ............... C09D 5/00 524/780 |
| 2011/0114871 A1* | 5/2011 | Koyama ............ B82Y 30/00 252/75 |
| 2011/0257298 A1* | 10/2011 | Ishihara ............ G02B 1/14 524/413 |

FOREIGN PATENT DOCUMENTS

| CN | 101815676 A | 8/2010 |
| JP | S52-11261 A | 1/1977 |
| JP | S53-111336 A | 9/1978 |
| JP | S55-013747 A | 1/1980 |
| JP | S56-116003 A | 9/1981 |
| JP | S62-151801 A | 7/1987 |
| JP | S63-275682 A | 11/1988 |
| JP | S64-054021 A | 3/1989 |
| JP | H02-262104 A | 10/1990 |
| JP | H10-245224 A | 9/1998 |
| JP | H10-306258 A | 11/1998 |
| JP | H10-310429 A | 11/1998 |
| JP | 2001-123115 A | 5/2001 |
| JP | 2002-363442 A | 12/2002 |
| JP | 2006-70144 A | 3/2006 |
| JP | 2007-246351 A | 9/2007 |
| JP | 2010-42947 A | 2/2010 |
| JP | 2010-168266 A | 8/2010 |
| WO | 2010/008050 A1 | 1/2010 |

OTHER PUBLICATIONS

English translation of Ishibai et al. WO 2010143645 (Year: 2010).*
Dec. 12, 2014 Office Action issued in Chinese Patent Application No. 201280037509.2.
International Search Report issued in International Patent Application No. PCT/JP2012/064296 mailed Jul. 17, 2012.
International Preliminary Report on Patentability issued in International Patent Application No. PCT/JP2012/064296 mailed Dec. 4, 2013.

* cited by examiner

*Primary Examiner* — Ronak C Patel
(74) *Attorney, Agent, or Firm* — Oliff PLC

(57) ABSTRACT

A substrate is coated with a transparent coating film using a coating liquid for forming a transparent coating film including metal oxide particles and a matrix formation component. The metal oxide particles each include a metal oxide particle containing titanium oxide coated with silicon dioxide-stannic oxide complex oxide, including a titanium oxide-containing core particle; and a coating layer with which the titanium oxide-containing core particle is coated and that is made of silicon dioxide-stannic oxide complex oxide colloidal particles having a mass ratio of silicon dioxide/stannic oxide of 0.1 to 5.0, where one or more intermediate thin film layers that are made of any one of an oxide; a complex oxide of at least one element selected from Si, Al, Sn, Zr, Zn, Sb, Nb, Ta, and W; and a mixture of the oxide and the complex oxide are interposed between the core particle and the coating layer.

13 Claims, No Drawings

METAL OXIDE PARTICLES CONTAINING TITANIUM OXIDE COATED WITH SILICON DIOXIDE-STANNIC OXIDE COMPLEX OXIDE

TECHNICAL FIELD

The present invention relates to a metal oxide particle containing titanium oxide coated with silicon dioxide-stannic oxide complex oxide comprising: a titanium oxide-containing core particle (A); and a coating layer with which the titanium oxide-containing core particle (A) is coated and that is made of silicon dioxide-stannic oxide complex oxide colloidal particles (B) having a mass ratio of silicon dioxide/stannic oxide of 0.1-5.0, in which one or more intermediate thin film layers that are made of any one of an oxide; a complex oxide of at least one element selected from the group consisting of Si, Al, Sn, Zr, Zn, Sb, Nb, Ta, and W; and a mixture of the oxide and the complex oxide are interposed between the titanium oxide-containing core particle (A) and the coating layer made of the silicon dioxide-stannic oxide complex oxide colloidal particles (B). The present invention also relates to a water dispersion sol, organic solvent dispersion sol, or mixed solvent of water and organic solvent dispersion sol of the particles, a coating liquid for forming a transparent coating film containing the particles; and a substrate coated with a transparent coating film formed using the coating liquid.

BACKGROUND ART

Plastic molded articles are used in a large quantity, utilizing the advantages such as light weight, easy formability, and impact resistance. On the other hand, the plastic molded articles have practical disadvantages when used for lenses for glasses, window materials, and the like because the plastic molded articles are easily scratched due to insufficient hardness, are easily affected by solvents, are charged to attach dusts, and have insufficient heat resistance. Consequently, a technique to apply protection coating film to a plastic molded article has been developed. A large number of various kinds of coating liquids have been developed as a coating liquid for forming a coating film used for the protection coating film.

As a coating liquid for forming a coating film that provides a hard coating film having hardness close to those of inorganic substances, a coating solution for forming a coating film in which an organic silicon compound or a hydrolysate thereof is a main component (a resin component or a coating film forming component) is used for lenses for glasses (see Patent Document 1).

The coating solution for forming a coating film has still insufficient scratch resistance, so that a coating liquid made by further adding a silicon dioxide sol that is colloidally dispersed to the coating liquid for forming a coating film has been developed and used for lenses for glasses (see Patent Document 2).

Most of plastic lenses for glasses have been produced by cast polymerization of a diethylene glycol bis(allyl carbonate) monomer. Such a lens has a refractive index of about 1.50 that is lower than a refractive index of a glass lens of about 1.52, and the lens thus has a disadvantage that a thickness of the edge of the lens is made thick when the lens is used as a lens for nearsightedness. Consequently, recently, a monomer having higher refractive index than the refractive index of diethylene glycol bis(allyl carbonate) has been developed and a high refractive index resin material having a refractive index in a range of 1.54 to 1.76 has been developed (see Patent Documents 3 and 4).

A method for using a colloidal dispersion of metal oxide fine particles of Sb and Ti as a coating material applied to the high refractive index resin lens has been also developed (see Patent Documents 5 and 6).

A coating composition is disclosed which includes a silane coupling agent and particles (c) obtained by coating a surface of colloidal particles (a) of a metal oxide having a primary particle diameter of 2 nm to 60 nm acting as cores with a coating material (b) made of colloidal particles of an acidic oxide, contains (c) in a ratio of 2% by mass to 50% by mass in terms of the metal oxide, and includes a stable modified metal oxide sol having a primary particle diameter of 2 nm to 100 nm. As a specific example of the used colloidal particles, a modified titanium oxide-stannic oxide-zirconium oxide complex colloid coated with antimony pentoxide containing an alkyl amine is disclosed (see Patent Document 7). A titanium oxide-stannic oxide zirconium oxide complex colloid stabilized with an alkyl amine or an oxycarboxylic acid is disclosed (see to Patent Document 8).

PRIOR ART DOCUMENTS

Patent Documents

Patent Document 1: Japanese Patent Application Publication No. S52-11261 (JP S52-11261 A)
Patent Document 2: Japanese Patent Application Publication No. S53-111336 (JP S53-111336 A)
Patent Document 3: Japanese Patent Application Publication No. S55-13747 (JP S55-13747 A)
Patent Document 4: Japanese Patent Application Publication No. S64-54021 (JP S64-54021 A)
Patent Document 5: Japanese Patent Application Publication No. S62-151801 (JP S62-151801 A)
Patent Document 6: Japanese Patent Application Publication No. S63-275682 (JP S63-275682 A)
Patent Document 7: Japanese Patent Application Publication No. 2001-123115 (JP 2001-123115 A)
Patent Document 8: Japanese Patent Application Publication No. H10-306258 (JP H10-306258 A)

SUMMARY OF THE INVENTION

Problem to be Solved by the Invention

In a high refractive index resin lens, however, a coating film using a silicon dioxide sol generates an interference pattern, resulting in poor lens appearance. In a coating film using a titanium oxide sol, the lens is disadvantageously colored in blue due to excitation of the titanium oxide by ultraviolet rays. When an anti-reflective coating is not applied on the coating film, excitation of the titanium oxide caused by ultraviolet rays cannot be suppressed, and thus, cracks are prone to generate.

An object of the present invention is to provide metal oxide particles that can adjust a refractive index to be high so as to be used with medium and high refractive index plastic substrates having a refractive $n_D$ of 1.54 to 1.76, has a microscopic particle diameter in order to ensure high transparency, and can almost suppress excitation caused by ultraviolet rays. Another object of the present invention is to provide a coating liquid for forming a transparent coating film including such particles and a substrate coated with a transparent coating film.

Means for Solving the Problem

The present invention provides, as a first aspect, a metal oxide particle containing titanium oxide coated with silicon dioxide-stannic oxide complex oxide comprising:
a titanium oxide-containing core particle (A); and
a coating layer with which the titanium oxide-containing core particle (A) is coated and that is made of silicon dioxide-stannic oxide complex oxide colloidal particles (B) having a mass ratio of silicon dioxide/stannic oxide of 0.1 to 5.0, in which one or more intermediate thin film layers that are made of any one of an oxide; a complex oxide of at least one element selected from the group consisting of Si, Al, Sn, Zr, Zn, Sb, Nb, Ta, and W; and a mixture of the oxide and the complex oxide are interposed between the titanium oxide-containing core particle (A) and the coating layer made of the silicon dioxide-stannic oxide complex oxide colloidal particles (B);
as a second aspect, the metal oxide particle containing titanium oxide coated with silicon dioxide-stannic oxide complex oxide according to the first aspect, in which a titanium oxide content in the titanium oxide-containing core particle (A) is 5% by mass to 100% by mass in terms of $TiO_2$, and an amount of the coating layer made of the silicon dioxide-stannic oxide complex oxide colloidal particles (B) to a mass of the titanium oxide-containing core particle (A) is in a range of 0.01 to 1.0;
as a third aspect, the metal oxide particle containing titanium oxide coated with silicon dioxide-stannic oxide complex oxide according to the first aspect or the second aspect, in which the titanium oxide-containing core particle (A) includes at least one element selected from the group consisting of Si, Al, Sn, Zr, Zn, Sb, Nb, Ta, and W;
as a fourth aspect, the metal oxide particle containing titanium oxide coated with silicon dioxide-stannic oxide complex oxide according to any one of the first aspect to the third aspect, in which a crystal type of the titanium oxide-containing core particle (A) is a rutile type;
as a fifth aspect, the metal oxide particle containing titanium oxide coated with silicon dioxide-stannic oxide complex oxide according to any one of the first aspect to the fourth aspect, in which an organic silicon compound or an amine-based compound is bonded to a surface of the metal oxide particle;
as a sixth aspect, a dispersion sol of metal oxide particles containing titanium oxide coated with silicon dioxide-stannic oxide complex oxide comprising:
a dispersion medium; and
metal oxide particles dispersed in the dispersion medium, in which the metal oxide particles are each the metal oxide particle containing titanium oxide coated with silicon dioxide-stannic oxide complex oxide as described in any one of the first aspect to the fifth aspect, and the dispersion medium is water, an organic solvent, or a mixed solvent of water and the organic solvent;
as a seventh aspect, a coating liquid for forming a transparent coating film comprising:
metal oxide particles; and
a matrix formation component, in which
the metal oxide particles each include such metal oxide particle containing titanium oxide coated with silicon dioxide-stannic oxide complex oxide as described in any one of the first aspect to the fifth aspect, and
the matrix formation component includes at least one selected from the group consisting of an organic silicon compound of Formula (I):

$$R^1_a R^2_b Si(OR^3)_{4-(a+b)} \qquad (I)$$

(where $R^1$ is a $C_{1-10}$ hydrocarbon group, a vinyl group, a methacryloxy group, or an organic group containing a mercapto group, an amino group, or an epoxy group; $R^2$ is a $C_{1-4}$ hydrocarbon group; $R^3$ is a $C_{1-8}$ hydrocarbon group or an acyl group; and a and b are each 0 or 1), a hydrolysate of the organic silicon compound, and a partial condensate of the hydrolysate;
as an eighth aspect, a coating liquid for forming a transparent coating film comprising:
metal oxide particles; and
a matrix formation component, in which
the metal oxide particles each include the metal oxide particle containing titanium oxide coated with silicon dioxide-stannic oxide complex oxide as described in any one of the first aspect to the fifth aspect, and
the matrix formation component includes at least one resin selected from the group consisting of a thermosetting resin, a thermoplastic resin, and an ultraviolet curing resin;
as a ninth aspect, the coating liquid for forming a transparent coating film according to the eighth aspect, in which the matrix formation component is a polyester-based resin or a urethane-based resin;
as a tenth aspect, a substrate coated with a transparent coating film comprising:
a transparent coating film formed on a surface of the substrate by using the coating liquid for forming a transparent coating film as described in any one of the seventh aspect to the ninth aspect;
as an eleventh aspect, a substrate coated with a transparent coating film comprising:
a primer film formed on a surface of the substrate by using the coating liquid for forming a transparent coating film as described in the eighth aspect or the ninth aspect, and a hard coating film formed on the primer film by using the coating liquid for forming a transparent coating film as described in the seventh aspect; and
as a twelfth aspect, the substrate coated with a transparent coating film according to the tenth aspect or the eleventh aspect, further comprising:
an anti-reflective coating on the transparent coating film or the hard coating film.

Effects of the Invention

When a metal oxide particle containing titanium oxide coated with silicon dioxide-stannic oxide complex oxide of the present invention comprising: a titanium oxide-containing core particle (A); and a coating layer with which the titanium oxide-containing core particle is coated and that is made of silicon dioxide-stannic oxide complex oxide colloidal particles (B) having a mass ratio of silicon dioxide/stannic oxide of 0.1-5.0, in which one or more intermediate thin film layers that are made of any one of an oxide; a complex oxide of at least one element selected from the group consisting of Si, Al, Sn, Zr, Zn, Sb, Nb, Ta, and W; and a mixture of the oxide and the complex oxide are interposed between the titanium oxide-containing core particle (A) and the coating layer made of the silicon dioxide-stannic oxide complex oxide colloidal particles (B) is formulated in a coating liquid for forming a transparent coating film that forms a transparent coating film on a substrate such as synthetic resin lenses, the transparent coating film has no change in color or color deterioration even when the transparent coating film is irradiated with ultraviolet rays. In other words, the metal oxide particle of the present invention is a metal oxide particle having excellent weatherability and light stability.

The metal oxide particles of the present invention also have high transparency because a particle diameter of the metal oxide particles is microscopic.

According to the present invention, a refractive index of the transparent coating film formed on a substrate can be easily adjusted by changing a mass ratio of the matrix formation component and the metal oxide particles containing titanium oxide coated with silicon dioxide-stannic oxide complex oxide colloidal particles in the coating liquid or a composition of the metal oxide particles containing titanium oxide coated with silicon dioxide-stannic oxide complex oxide colloidal particles. Consequently, when the coating liquid for forming a transparent coating film of the present invention is used, the refractive index of the transparent coating film formed from the coating liquid can be equalized to the refractive index of the substrate and an interference pattern caused by difference in refractive indices of the transparent coating film and the substrate can be eliminated. The coating liquid for forming a transparent coating film of the present invention can thus be suitably used for a coating liquid for forming a transparent coating film for medium and high refractive index lenses. When the refractive index of the coating film is set significantly higher than the refractive index of the substrate, glaze of the substrate surface can be made significantly high.

The coating film formed on the substrate using the coating liquid for forming a transparent coating film according to the present invention contains titanium oxide as the main component in the metal oxide particles in the coating film, and therefore, the coating film has an excellent shielding effect to ultraviolet rays and is suitable for a surface coating film, a topcoat film, or both for automobiles and the like.

The coating film formed on the substrate using the coating liquid for forming a transparent coating film according to the present invention is colorless and transparent, has excellent adhesion to the substrate, weatherability, light stability, chemical resistance, flexibility, and dyeing affinity, and has high surface hardness. As a result, the coating film according to the present invention has excellent scratch resistance and abrasion resistance. Consequently, the coating liquid for forming a transparent coating film according to the present invention is suitable for providing lenses for glasses, various kinds of optical lenses for cameras and the like, various kinds of display element filters, looking glass, and the like. When the coating liquid for forming a transparent coating film according to the present invention is formed into a high refractive index layer at the time of forming a multilayer anti-reflective coating on the substrate surface of the looking glass, window glass, the various kinds of display element filters, and the like, a content can be clearly seen.

When the anti-reflective coating described above is formed on surfaces of various display elements, fluorescent light and the like are not reflected on these display elements, and therefore, images are clear and eyestrain can be prevented.

MODES FOR CARRYING OUT THE INVENTION

The metal oxide particles containing titanium oxide coated with silicon dioxide-stannic oxide complex oxide colloidal particles of the present invention is characterized by including: titanium oxide-containing core particles (A); and coating layers with which the titanium oxide-containing core particles are coated and that are made of silicon dioxide-stannic oxide complex oxide colloidal particles, in which one or more intermediate thin film layers that are made of any one of an oxide; a complex oxide of at least one element selected from the group consisting of Si, Al, Sn, Zr, Zn, Sb, Nb, Ta, and W; and a mixture of the oxide and the complex oxide are interposed between the titanium oxide-containing core particles (A) and the coating layers made of the silicon dioxide-stannic oxide complex oxide colloidal particles (B).

A primary particle diameter of the complex metal oxide particles containing titanium oxide coated with silicon dioxide-stannic oxide complex oxide is not particularly limited, and the diameter is in a range of 1 nm to 100 nm, and preferably in a range of 2 nm to 60 nm. Here, the primary particle diameter refers to a diameter measured by transmission electron microscope observation.

When the primary particle diameter is less than 1 nm, a coating film obtained by using a coating liquid containing these particles has insufficient hardness and poor scratch resistance and abrasion resistance. The refractive index of the coating film may not be sufficiently high. When the primary particle diameter exceeds 100 nm, an obtained coating film may be clouded and opaque.

The primary particle diameter of the titanium oxide-containing core particles (A) is not particularly limited, and it is desirable that the primary particle diameter be approximately in a range of 1 nm to 100 nm, and preferably in a range of 2 nm to 50 nm.

A content of titanium oxide in the titanium oxide-containing core particles (A) is 5% by mass to 100% by mass, preferably 10% by mass or more, and more preferably 20% by mass or more in terms of $TiO_2$. When the content of titanium oxide is less than 10% by mass, a refractive index of a transparent coating film obtained by using a coating liquid containing these particles is not high, and an interference pattern may be generated depending on the refractive index of the substrate.

The titanium oxide-containing core particles (A) may be made of only titanium oxide or may be made of titanium oxide and a component or components other than titanium oxide. The titanium oxide-containing core particles (A) preferably include at least one element selected from the group consisting of Si, Al, Sn, Zr, Zn, Sb, Nb, Ta, and W. Titanium oxide and the component other than titanium oxide described above may be a mixture or a solid solution state.

Specific examples of the case that the component(s) other than titanium oxide is(are) included in the titanium oxide-containing core particles (A) include particles made of titanium oxide and stannic oxide or particles made of titanium oxide and stannic oxide and zirconium oxide.

The titanium oxide-containing core particles (A) may be amorphous, or crystals such as anatase type crystal, rutile type crystal, or brookite type crystal. The titanium oxide-containing core particles (A) may also be a perovskite type titanium compound such as barium titanate ($BaTiO_3$ or $BaO.TiO_2$). Among them, a crystal type of the titanium oxide-containing core particles (A) is preferably the rutile type crystal.

An amount of the coating layers made of the silicon dioxide-stannic oxide complex oxide colloidal particles (B) in the metal oxide particles containing titanium oxide coated with silicon dioxide-stannic oxide complex oxide colloidal particles of the present invention is in a range of 0.01 to 1.0 to a mass of the titanium oxide-containing core particles (A).

In the metal oxide particles containing titanium oxide coated with silicon dioxide-stannic oxide complex oxide colloidal particles of the present invention, one or more intermediate thin film layers that are made of any one of an oxide; a complex oxide of at least one element selected from the group consisting of Si, Al, Sn, Zr, Zn, Sb, Nb, Ta, and W; and a mixture of the oxide and the complex oxide are interposed between the titanium oxide-containing core particles (A) and the coating layers made of the silicon dioxide-stannic oxide complex oxide colloidal particles (B). The intermediate thin film layer may be one layer or two or more layers.

By interposing at least one intermediate thin film layer between the titanium oxide-containing core particles (A) and the coating layers made of the silicon dioxide-stannic oxide complex oxide colloidal particles (B), the refractive index of the metal oxide particles containing titanium oxide coated with silicon dioxide-stannic oxide complex oxide colloidal particles can be adjusted and it is possible to improve various properties, such as light stability, weatherability, adhesion between the coating film and the substrate, of a coating film obtained by using a coating liquid containing these particles. Furthermore, coloring of the metal oxide particles containing titanium oxide coated with silicon dioxide-stannic oxide complex oxide colloidal particles can be suppressed and the transparency of the coating film can be improved.

The number of the intermediate thin film layers that are provided at least one layer and the thickness of the layer are not particularly limited as long as a ratio of the titanium oxide-containing core particles (A) and the coating layers made of the silicon dioxide-stannic oxide complex oxide colloidal particles (B) in the metal oxide particles containing titanium oxide coated with silicon dioxide-stannic oxide complex oxide colloidal particles is in a range of 0.01 to 1.0 as an amount of the coating layers made of the silicon dioxide-stannic oxide complex oxide colloidal particles (B) to a mass of the titanium oxide-containing core particles (A) as a standard.

As the intermediate thin film layer, silicon dioxide, antimony oxide, aluminum oxide, or zirconium oxide is particularly suitable. As forms, silicon dioxide, antimony oxide, aluminum oxide or zirconium oxide may be stacked for each component to form a thin film layer, or complex compound such as antimony oxide-silicon dioxide complex is formed to form a thin film layer.

In this case, when silicon oxide and zirconium oxide and/or aluminum oxide are used as materials for the intermediate thin film layer, complex oxide particles containing titanium oxide coated with antimony oxide that can form a transparent coating film having excellent weatherability, light stability, adhesion to the substrate, film hardness, scratch resistance, and flexibility can be obtained. When silicon oxide is contained in the thin film layer, stability of a complex oxide fine particle dispersion water sol is improved; a pot life of a coating liquid described below becomes longer, and increase in hardness of an obtained transparent coating film and improvement of adhesion between the transparent coating film and an anti-reflective coating that is formed on the transparent coating can be achieved. In this case as well, weatherability, light stability, adhesion to the substrate, film hardness, scratch resistance, flexibility, and the like are improved.

In the metal oxide particles containing titanium oxide coated with silicon dioxide-stannic oxide complex oxide of the present invention, an organic silicon compound or an amine-based compound is preferably bonded to the surface of the metal oxide particles.

As the organic silicon compound used, a known organic silicon compound known as silane coupling agent can be used. A Type of the organic silicon compound is adequately selected depending on applications and the type of solvent.

As the organic silicon compound, specifically, the compounds of General Formulae (1) to (4) below are used.

Monofunctional silanes of General Formula (1):
$$R_3SiX \quad (1)$$

(in General Formula (1), R is an organic group having a $C_{1-8}$ alkyl group, a phenyl group, a vinyl group, a methacryloxy group, a mercapto group, an amino group, and an epoxy group, and X is a hydrolyzable group). Examples of the monofunctional silanes may include trimethylsilane, dimethylphenylsilane, and dimethylvinylsilane.

Bifunctional silanes of General Formula (2): $R_2SiX_2$ (2)

(in General Formula (2), R is an organic group having a $C_{1-8}$ alkyl group, a phenyl group, a vinyl group, a methacryloxy group, a mercapto group, an amino group, and an epoxy group, and X is a hydrolyzable group). Examples of the bifunctional silanes may include dimethyl silane and diphenyl silane.

Trifunctional silanes of General Formula (3): $RSiX_3$ (3)

(in General Formula (3), R is an organic group having a $C_{1-10}$ alkyl group, a phenyl group, a vinyl group, a methacryloxy group, a mercapto group, an amino group, and an epoxy group, and X is a hydrolyzable group). Examples of the trifunctional silanes may include methylsilane and phenylsilane.

Tetrafunctional silanes of General Formula (4): $SiX_4$ (4)

(in General Formula (4), X is a hydrolyzable group). Examples of the tetrafunctional silanes may include tetraalkoxysilanes such as tetraethoxysilane.

These organic silicon compounds may be used singly or in combination of two or more of them. When surface modification treatment is carried out in which the organic silicon compound is bonded to the surface of the metal oxide particles containing titanium oxide coated with silicon dioxide-stannic oxide complex oxide, the organic silicon compound may be partially hydrolyzed or the surface modification treatment may be carried out without hydrolysis. A preferable state after the surface modification treatment is a state in which the hydrolyzable groups are reacted with hydroxy groups on the surface of the metal oxide particles containing titanium oxide coated with silicon dioxide-stannic oxide complex oxide. However, a state in which a part of the hydroxy groups remains untreated does not cause any problems.

Examples of the amine-based compounds used may include alkylamines such as ethylamine, triethylamine, isopropylamine and n-propylamine, aralkylamines such as benzyl amine, alicyclic amines such as piperidine, alkanolamines such as monoethanolamine and triethanolamine, quaternary ammonium salts and quaternary ammonium hydroxides such as tetramethylammonium hydroxide.

These amine-based compounds may be used singly or in combination of two or more of them.

These amine-based compounds may be bonded to the surface of the particles by, for example, reacting with hydroxy groups on the surface of the metal oxide particles containing titanium oxide coated with silicon dioxide-stannic oxide complex oxide or by coordination bonds to the surface of the particles.

For bonding the organic silicon compound or the amine-based compound to the surface of the complex metal oxide particles containing titanium oxide coated with silicon dioxide-stannic oxide complex oxide colloidal particles, for example, the complex metal oxide particles containing titanium oxide coated with silicon dioxide-stannic oxide complex oxide colloidal particles are mixed in an alcohol solution of the organic silicon compound or the amine-based compound and then a predetermined amount of water and, if necessary, a hydrolysis catalyst are added, and thereafter, the mixture may be left to stand for a predetermined period at room temperature or may be subjected to heat treatment.

This process can be also carried out by adding the hydrolysate of the organic silicon compound and the complex metal oxide particles containing titanium oxide coated with silicon dioxide-stannic oxide complex oxide colloidal particles to a mixed liquid of water and alcohol and subjecting the mixture to heat treatment.

The organic silicon compound or the amine-based compound used can be added in an amount of 0.1% by mass to 40% by mass to a mass of the metal oxide particles in the complex metal oxide particles containing titanium oxide coated with silicon dioxide-stannic oxide complex oxide colloidal particles.

The metal oxide particles containing titanium oxide coated with silicon dioxide-stannic oxide complex oxide of the present invention can be treated as a metal oxide dispersion sol in which the metal oxide particles are dispersed in water, an organic solvent, or a mixed solvent of water and the organic solvent.

A complex metal oxide particle containing titanium oxide coated with silicon dioxide-stannic oxide complex oxide dispersion sol of the present invention is a sol in the which the complex metal oxide particles containing titanium oxide coated with silicon dioxide-stannic oxide complex oxide are dispersed in water, an organic solvent, or a mixed solvent of water and the organic solvent.

The intermediate thin film layer is provided in the complex metal oxide particle containing titanium oxide coated with silicon dioxide-stannic oxide complex oxide dispersion sol of the present invention, and therefore, the sol has excellent dispersion stability compared with the conventionally known titanium oxide sol and titanium oxide-based complex oxide sol.

A total metal oxide concentration in the water dispersion sol of the complex metal oxide particles containing titanium oxide coated with silicon dioxide-stannic oxide complex oxide colloidal particles is in a range of 0.01% by mass to 40% by mass, and preferably in a range of 0.5% by mass to 20% by mass. When the total metal oxide concentration is less than 0.01% by mass, a concentration of a coating liquid obtained by formulating other components is too low, so that a desired thickness of an obtained coating film may not be acquired. When the total metal oxide concentration exceeds 40% by mass, stability of the sol may be insufficient.

In the case of an organic solvent dispersion sol of the complex metal oxide particles containing titanium oxide coated with silicon dioxide-stannic oxide complex oxide, the organic silicon compound or the amine-based compound is preferably bonded to the surface of the complex metal oxide particles containing titanium oxide coated with silicon dioxide-stannic oxide complex oxide to carry out the surface modification treatment. The particles to which the surface modification treatment is carried out have excellent dispersibility to an organic solvent because the surface of the particles is hydrophobic.

A total metal oxide concentration of the organic solvent dispersion sol of the complex metal oxide particles containing titanium oxide coated with silicon dioxide-stannic oxide complex oxide is in a range of 1% by mass to 60% by mass, and preferably in a range of 2% by mass to 30% by mass. When the total metal oxide concentration is less than 1% by mass, a concentration of a coating liquid obtained by formulating other components is too low, so that a desired thickness of an obtained coating film may not be acquired. When a solid content concentration exceeds 60% by mass, stability of the sol is insufficient.

Specific examples of the organic solvent used in the organic solvent dispersion sol of the complex metal oxide particles containing titanium oxide coated with silicon dioxide-stannic oxide complex oxide of the present invention include alcohols such as methanol, ethanol, isopropyl alcohol; cellosolves such as methyl cellosolve and ethyl cellosolve; glycols such as ethylene glycol; esters such as methyl acetate and ethyl acetate; ethers such as diethyl ether and tetrahydrofuran; ketones such as acetone and methyl ethyl ketone; halogenated hydrocarbons such as dichloroethane; aromatic hydrocarbons such toluene and xylene; and N-dimethylformamide. These solvents may be used in combination of two or more of them.

A first coating liquid for forming a transparent coating film according to the present invention is characterized by including the metal oxide particles containing titanium oxide coated with silicon dioxide-stannic oxide complex oxide and one or more of an organic silicon compound of General Formula (I), a hydrolysate of the organic silicon compound, and a partial condensate of the hydrolysate as a matrix formation component.

$$R^1_a R^2_b Si(OR^3)_{4-(a+b)} \quad (I)$$

(where $R^1$ is a $C_{1\text{-}10}$ hydrocarbon group, a vinyl group, a methacryloxy group, or an organic group containing a mercapto group, an amino group, or an epoxy group; $R^2$ is a $C_{1\text{-}4}$ hydrocarbon group; $R^3$ is a $C_{1\text{-}8}$ hydrocarbon group or an acyl group; and a and b are each 0 or 1).

Specific example of the organic silicon compound of General Formula (I) may include tetramethoxysilane, tetraethoxysilane, methyltrimethoxysilane, ethyltriethoxysilane, methyltriethoxysilane, phenyltriethoxysilane, dimethyldimethoxysilane, phenylmethyldimethoxysilane, vinyltrimethoxysilane, vinyltriethoxysilane, vinyltris(β-methoxyethoxy)silane, γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)ethyltrimethoxysilane, γ-methacryloxypropyltrimethoxysilane, N-β(aminoethyl)γ-aminopropyltrimethoxysilane, N-β(aminoethyl)γ-aminopropylmethyldimethoxysilane, γ-aminopropyltriethoxysilane, N-phenyl-γ-aminopropyltrimethoxysilane, and γ-mercaptopropyltrimethoxysilane. These compounds may be used singly or by mixing two or more of them.

These organic silicon compounds are preferably hydrolyzed and used in the presence of acid under a non-solvent condition or in a polar organic solvent such as alcohol.

The organic silicon compound of General Formula (I) and the complex metal oxide particles containing titanium oxide coated with silicon dioxide-stannic oxide complex oxide may be mixed after hydrolysis of the organic silicon compound of Formula (I) or the organic silicon compound of General Formula (I) may be hydrolyzed after mixing with the complex metal oxide particles containing titanium oxide coated with silicon dioxide-stannic oxide complex oxide. In the hydrolysis, the organic silicon compound of General Formula (I) may be fully hydrolyzed or may be partially hydrolyzed.

A ratio of the matrix formation component in the coating liquid for forming a transparent coating film is adequately in a range of 10% by mass to 90% by mass and preferably in a range of 20% by mass to 80% by mass. When the ratio is less than 10% by mass, adhesion between a substrate and a coating film may be deteriorated, and when exceeding 90% by mass, a coating film having a high refractive index may not be obtained.

A second coating liquid for forming a transparent coating film of the present invention is characterized by including the metal oxide particles containing titanium oxide coated with silicon dioxide-stannic oxide complex oxide and at least one resin selected from the group consisting of a thermosetting resin, a thermoplastic resin, and an ultraviolet curing resin as a matrix formation component.

As the matrix formation component, an acrylic resin, a melamine-based resin, a urethane based resin, a polyester resin, a phosphagen-based resin, or the like is used. Among them, the polyester-based resin and the urethane based resin are preferable.

In the coating liquid for forming a transparent coating film of the present invention, the complex metal oxide particles containing titanium oxide coated with silicon dioxide-stannic oxide complex oxide are 5 parts by mass to 1000 parts by mass and preferably 10 parts by mass to 600 parts by mass to 100 parts by mass of a solid content of the matrix formation component dried at 110° C.

In the coating liquid for forming a transparent coating film of the present invention, the following components (C) to (F) may be optionally included other than the complex metal oxide particles containing titanium oxide coated with silicon dioxide-stannic oxide complex oxide and the matrix formation component.

Component (C):

The component (C) is one or more hydrolysate or partial condensate of the tetrafunctional organic silicon compound of General Formula (5): $Si(OR^4)_4$ (5) (in General Formula (5), $R^4$ is a $C_{1-8}$ hydrocarbon group, an alkoxyalkyl group or an acyl group).

The organic silicon compound of General Formula (5) is used for the purpose of adjusting a refractive index of a transparent coating film to be formed, and also for accelerating a curing rate of the coated transparent coating film and improving a hardness of the transparent coating film. By using the component (C), the refractive index of the transparent coating film after curing can be adequately adjusted depending on the refractive index of the substrate and adhesion of the anti-reflective coating can be ensured even if the content of the complex metal oxide particles containing titanium oxide coated with silicon dioxide-stannic oxide complex oxide is decreased to some extent.

Specific examples of the tetrafunctional organic silicon compound of General Formula (5) may include tetramethoxysilane, tetraethoxysilane, tetrapropoxysilane, tetraisopropoxysilane, tetrabutoxysilane, tetraphenoxysilane silane, tetraacetoxysilane, tetraallyloxysilane, tetrakis(2-methoxyethoxy)silane, tetrakis(2-ethylbutoxysilane), and tetrakis(2-ethylhexyloxy) silane. These compounds may be used singly or in combination of two or more of them. These compounds are preferably hydrolyzed and used in the presence of acid under a non-solvent condition or in an organic solvent such as alcohol.

A content ratio of the component (C) in the coating liquid for forming a transparent coating film is adequately 0% by mass to 50% by mass to the mass of the coating liquid for forming a transparent coating film as a standard. This is because the transparent coating film after curing is easily cracked when the content ratio exceeds 50% by mass.

Component (D):

The component (D) is metal oxide fine particles of at least one element selected from the group consisting of Si, Al, Sn, Sb, Ta, Ce, La, Zn, W, Nb, Zr, and In or a complex metal oxide of one or more elements selected from the group, and a primary particle diameter of the component (D) is 1 nm to 50 nm. Specifically, metal oxide fine particles such as $SiO_2$, $Al_2O_3$, $SnO_2$, $Sb_2O_5$, $Ta_2O_5$, $CeO_2$, $La_2O_3$, $ZnO$, $WO_3$, $ZrO_2$, $In_2O_3$, and $Nb_2O_5$, complex oxide fine particles such as $ZnSbO_6$ and $ZnSnO_3$, or both of the metal oxide fine particles and the complex oxide fine particles are dispersed in water or an organic solvent in a colloidal state.

The component (D) to the surface of which the organic silicon compound of General Formulae (1) to (4) or the amine-based compound is bonded also can be used.

Component (E):

The component (E) is at least one selected from the group consisting of a polyfunctional epoxy compound, a polyvalent carboxylic acid, and a polyvalent carboxylic acid anhydride. These compounds are used for the purpose of improvement of hardness of the transparent coating film to be formed.

The polyfunctional epoxy compound means an epoxy resin having two or more epoxy groups in one molecule, and examples of the polyfunctional epoxy compound include ethylene glycol diglycidyl ether, diethylene glycol diglycidyl ether, and 1,4-cyclohexanedimethanol diglycidyl ether, which have been known.

Examples of the polyvalent carboxylic acid and the polyvalent carboxylic acid anhydride include malonic acid, succinic acid, adipic acid, azelaic acid, maleic acid, orthophthalic acid, terephthalic acid, fumaric acid, itaconic acid, oxaloacetic acid, succinic anhydride, maleic anhydride, itaconic anhydride, 2,3-dimethylmaleic anhydride, and phthalic anhydride.

A content ratio of the component (E) in the coating liquid for forming a transparent coating film is adequately 0% by mass to 40% by mass to the mass of the coating liquid for forming a transparent coating film as a standard. This is because when the content ratio exceeds 40% by mass, adhesion between the transparent coating film after curing and the anti-reflective coating formed thereon is deteriorated.

Component (F):

The component (F) is at least one curing catalyst selected from amines, amino acids, metal acetylacetonates, organic acid metal salts, perchloric acids, salts of perchloric acids, acids, and metal chlorides. The component (F) is used for accelerating curing of silanol groups or epoxy groups that the organic silicon-based matrix formation component contained in the coating liquid for forming a transparent coating film. By using these curing catalysts, a coating film formation reaction can be accelerated.

Specific examples of the curing catalyst include amines such as n-butylamine, triethylamine, guanidine, and biguanidide; amino acids such as glycine; metal acetylacetonates such as aluminum acetylacetonate, chromium acetylacetonate, titanyl acetylacetonate, and cobalt acetylacetonate; organic acid metal salts such as sodium acetate, zinc naphthenate, cobalt naphthenate, zinc octoate, and tin octoate;

perchloric acid and salts thereof such as perchloric acid, ammonium perchlorate, and magnesium perchlorate; acids such as hydrochloric acid, phosphoric acid, nitric acid, and p-toluenesulfonic acid; and metal salts being Lewis acids such as $SnCl_2$, $AlCl_3$, $FeCl_3$, $TiCl_4$, $ZnCl_2$, and $SbCl_3$.

Types and a used amount of these curing catalysts can be adjusted and used depending on the composition of the coating liquid for forming a transparent coating film. An upper limit of the used amount is desirably 5% by mass or less to the total solid content in the coating liquid.

In order to improve performance of the transparent film formed on the substrate using the coating liquid for forming a transparent coating film of the present invention, a small amount of a surfactant, an antistatic agent, an ultraviolet absorber, an oxidation inhibitor, a disperse dye, an oil soluble dye, a fluorescent dye, a pigment, a photochromic compound, and a thixotropic agent may be added, if necessary.

For the coating liquid for forming a transparent coating film of the present invention, a solvent is used for the purpose of providing flowability, adjusting solid content concentration, and adjusting surface tension, viscosity, and evaporation rate. The solvent used is water or an organic solvent.

Examples of the organic solvent used include alcohols such as methanol, ethanol, isopropyl alcohol; cellosolves such as methyl cellosolve and ethyl cellosolve; glycols such as ethylene glycol; esters such as methyl acetate and ethyl acetate; ethers such as diethyl ether and tetrahydrofuran; ketones such as acetone and methyl ethyl ketone; halogenated hydrocarbons such as dichloroethane; aromatic hydrocarbons such toluene and xylene; and N-dimethylformamide.

As a method for producing the metal oxide particles containing titanium oxide coated with silicon dioxide-stannic oxide complex oxide of the present invention, a conventionally known method can be employed.

The titanium oxide-containing core particles (A) can be produced by, for example, a method for producing complex oxide particles disclosed in Japanese Patent Application Publication No. H10-306258 (JP H10-306258 A) applied by the applicant of the present invention. A solid content concentration of the water dispersion sol of the titanium oxide-containing core particles (A) is 0.1% by mass to 30% by mass and preferably 0.5% by mass to 20% by mass as the total metal oxide. When the concentration of the water dispersion sol is less than 0.1% by mass, the productivity is low, which is industrially disadvantageous. When the solid content concentration exceeds 30% by mass, the obtained particles tend to form agglomerate, and therefore, it is difficult to obtain an excellent transparent coating film, which is not preferable.

A method for forming the intermediate thin film layer made of any one of the oxide; the complex oxide of at least one element selected from the group consisting of Si, Al, Sn, Zr, Zn, Sb, Nb, Ta, and W; and the mixture of the oxide and the complex oxideincludes firstly providing an aqueous solution or a colloidal particle dispersion liquid of an element that is a constituent of the intermediate thin film, charging the titanium oxide-containing core particles (A) in the solution or the dispersion liquid, and forming the intermediate thin film on the surface of the titanium oxide-containing core particles (A). At the time of forming the intermediate thin film layer, heating is preferably performed at 40° C. or more or 200° C. or less.

Subsequently, a water dispersion sol of the silicon dioxide-stannic oxide complex oxide colloidal particles (B) is added to the water dispersion sol of the titanium oxide-containing core particles (A) on which the intermediate thin film layer is formed to form a coating layer. An amount of the added silicon dioxide-stannic oxide complex oxide colloidal particles (B) is in a range of 0.01 to 1.0 to the titanium oxide-containing core particles (A).

For the water dispersion sol of the metal oxide particles containing titanium oxide coated with silicon dioxide-stannic oxide complex oxide obtained by the method described above, pH and temperature of the dispersion sol may be adequately adjusted, if necessary, and the water dispersion sol may be heated, if necessary. Heating is preferably performed at 40° C. or more or 200° C. or less. After forming the coating layer, impurity may be removed by rinsing treatment, if necessary. The total metal oxide concentration can be adjusted by a method such as ultrafiltration or evaporative concentration.

The dispersion sol of the metal oxide particles containing titanium oxide coated with silicon dioxide-stannic oxide complex oxide of the present invention is a sol in which water, an organic solvent, or a mixed solvent of water and the organic solvent is used as a dispersion medium. The organic solvent dispersion sol can be produced by solvent replacement of water, which is the dispersion medium of the water dispersion sol, by a commonly used method such as a distillation method or an ultrafiltration method.

The coating liquid for forming a transparent coating film of the present invention can be obtained by mixing the metal oxide particles containing titanium oxide coated with silicon dioxide-stannic oxide complex oxide obtained by the method described above with the matrix formation component and, if necessary, other components.

At the time of producing the coating liquid for forming a transparent coating film of the present invention, the dispersion sol of the metal oxide particles containing titanium oxide coated with silicon dioxide-stannic oxide complex oxide can be suitably used.

A solid content concentration of the coating liquid for forming a transparent coating film is 1% by mass to 70% by mass and preferably 2% by mass to 50% by mass as a total concentration that includes a solid content originated from other components used as necessary by mixing.

At the time of producing the coating liquid for forming a transparent coating film of the present invention, when the metal oxide particles containing titanium oxide coated with silicon dioxide-stannic oxide complex oxide can be easily dispersed in the coating liquid, the metal oxide particles may be used in the form of a fine powder, in addition to in the form of the dispersion sol, and further the dried dispersion sol may be used.

Subsequently, a substrate coated with a transparent coating film of the present invention will be described. The substrate coated with a transparent coating film of the present invention has a substrate and a high refractive index transparent coating film formed on the substrate, and the transparent coating film is formed from the coating liquid for forming a transparent coating film.

The substrate coated with a transparent coating film of the present invention is characterized by including the transparent coating film formed by using the first or the second coating liquid for forming a transparent coating film on the surface of the substrate.

The substrate coated with a transparent coating film of the present invention is also characterized by including a primer film formed by using the second coating liquid for forming a transparent coating film on the surface of the substrate and a hard coating film formed by using the first coating liquid for forming a transparent coating film on the primer film. The substrate coated with a transparent coating film may further include an anti-reflective coating on the transparent coating film or the hard coating film.

Various substrates made of glass, a plastic, and other materials are employed for the substrate used,. Specific examples of the substrate include lenses for glasses, various optical lenses for a camera and the like, various display element filters, looking glass, wind glass, coating films for automobiles, and lamp covers used for automobiles. On the surface of the substrate, a transparent coating film is formed as a hard coating film. Other than the hard coating film, a transparent coating film used as a primer film for a plastic lens may be formed.

The thickness of the coating film formed on these substrate surfaces varies depending on applications for the substrate coated with a coating film, and is preferably 0.05 μm to 30 μm.

The substrate coated with a transparent coating film of the present invention can be produced by applying the coating liquid for forming a transparent coating film to the surface of the substrate by the conventionally known methods such as a dipping method, a spin coating method, a spraying method, a roll coater method, and a flowing method and drying the substrate to form the coating film, and subsequently heating the coating film at a temperature lower than a heat resistance temperature of the substrate. For a lens substrate having a heat distortion temperature of less than 100° C., the spin coating method in which the lens substrate does not have to be fixed with a jig, is particularly preferable. When a substrate for forming a coating film is a resin lens, the coating film is desirably formed by applying the coating liquid onto the substrate, and thereafter, heating and drying the substrate at a temperature of 40° C. to 200° C. for several hours.

When an ultraviolet curing resin is used as the matrix formation component of the coating liquid for forming a transparent coating film, the substrate coated with a coating film according to the present invention can be produced by a method in which, after the coating liquid is applied to the surface of the substrate, the coated film is dried, and cured by irradiating the surface of the substrate on which the coating liquid is applied with ultraviolet rays having a predetermined wavelength.

Furthermore, at the time of producing the substrate coated with a coating film of the present invention, for the purpose of improving adhesion between a substrate, for example, a lens substrate and the coating film, the surface of the substrate may be previously treated with an alkali, an acid, or a surfactant, or may be treated by grinding with inorganic or organic fine particles, or may be treated with a primer or plasma.

The substrate coated with a coating film of the present invention may be a substrate having a primer film between the substrate and the hard coating layer. In this case, the primer film may be formed by using the second coating liquid for forming a transparent coating film and the hard coating film may be formed by using the first coating liquid for forming a transparent coating film.

In a plastic lens using a high refractive index optical material, a hard coating film is formed on the surface and a multi-coating layer is further formed on the hard coating film for the purpose of antireflection. In a process for forming the multi-coating layer, distortion is generated in the plastic lens substrate, and therefore, the lens may easily be broken by impact caused by falling and the like. Consequently, a soft primer film that absorbs impact is provided between the plastic lens and the hard coating film.

An interference pattern may be generated when the refractive index of the primer film is not equal to that of the substrate. However, when the second coating liquid for forming a transparent coating film is used, which includes the resin such as the acrylic resin, the melamine-based resin, the urethane based resin, the polyester resin, and the phosphagen-based resin as the matrix component among the coating liquids for forming a transparent coating film of the present invention, a primer film having an almost equal refractive index to the refractive index of the substrate can be formed.

In the case of forming the primer film described above, the coating film is cured after the coating liquid is applied by the method described above.

The coating liquid for forming a transparent coating film of the present invention can contain; a curing agent for accelerating the reaction; metal oxide fine particles for adjusting the refractive index to the refractive index of the substrate; and further various types of surfactants for improving wettability at the time of application and improving smoothness of the cured coating film can be added. Additives such as an ultraviolet absorber and an antioxidant can be further added as long as the additives do not affect physical property of the cured film.

The anti-reflective coating that is provided on the coating film obtained from the coating liquid for forming a transparent coating film of the present invention and made of a vapor-deposited film of an inorganic oxide is not particularly limited, and a single layer or a multi-layer anti-reflective coating made of the vapor-deposited film of the inorganic oxide that has been known may be used. Examples of the anti-reflective coating include anti-reflective coatings disclosed in Japanese Patent Application Publication No. H2-262104 (JP H2-262104 A) and Japanese Patent Application Publication No. S56-116003 (JP S56-116003 A).

An impact absorption film improves impact resistance. The impact absorption film is configured of a polyacrylic acid-based resin, a polyvinyl acetate-based resin, a polyvinyl alcohol-based resin, and the like.

The coating film obtained from the coating liquid for forming a transparent coating film of the present invention can be used for a reflection film as a high refractive index film, and further can be used for a multi-functional film by adding functional components such as antifogging, photochromic, and antifouling components.

Optical members having the coating film made of the coating composition of the present invention can be used for lenses for cameras, window glass for automobiles, optical filters attached to liquid crystal displays or plasma displays, other than the lenses for glasses.

EXAMPLES

The present invention will be further described in detail with reference to the following examples. The present invention, however, is not limited to the examples Preparation Examples Preparation Example 1

A water dispersion sol of titanium oxide-containing core particles (A1) was prepared based on Example 2 in Japanese Patent Application Publication No. H10-245224 (JP H10-245224 A).

Process (a): Into a 3-liter separable flask made of glass with a jacket, 293.8 g (79.8 g in terms of $TiO_2$) of titanium tetrachloride (manufacture by Sumitomo Sitix Co., Ltd., a concentration of 27.2% by mass in terms of $TiO_2$, Cl 32.0% by mass) and 371.6 g of water were poured to prepare 665 g of titanium chloride aqueous solution (12.0% by mass in terms of $TiO_2$). Stirred with a stirring bar made of glass, the aqueous solution was heated to 50° C., and thereafter, 950.8 g of 35% by mass hydrogen peroxide aqueous solution and 566.4 g of metal tin powder (manufactured by Yamaishi Metal Co., Ltd., trade name AT-Sn, No. 200) were added with cooling. The addition of the hydrogen peroxide aqueous solution and the metal tin powder was performed such that first 31.5 g (0.265 mol) of the metal tin, and then 53.8 g (0.554 mol) of the hydrogen peroxide aqueous solution were gradually added. After the reaction was completed, 31.5 g (0.265 mol) of the metal tin, and then 53.8 g (0.554 mol) of the hydrogen peroxide aqueous solution were gradually added. As described above, by repeating the addition of the metal tin and the successive addition of the hydrogen peroxide aqueous solution 17 times in total at 5 to 10-minute intervals, separation addition (31.5 of the metal tin and 53.8 g of the hydrogen peroxide aqueous solution were added 17 times) was carried out, and thereafter, finally 30.9 g of the metal tin and then 36.2 g of the hydrogen peroxide aqueous solution were added to carry out 18 times in total of the separation addition. The reaction was an exothermal reaction, and therefore, a temperature of the aqueous solution rose to 70° C. to 75° C. by the addition of the metal tin. After the reaction was completed, the aqueous solution was cooled to 50° C. to 60° C. The reaction was carried out at 50° C. to 75° C. An addition ratio of the hydrogen peroxide and the metal tin in one time was 2.09 in the molar ratio of $H_2O_2$/Sn. A required time for the addition of the hydrogen peroxide aqueous solution and the metal tin was 3.0 hours. After the reaction was completed, 3195.6 g of a basic titanium chloride-tin complex salt aqueous solution was obtained. At this time, a concentration of the aqueous solution was 25% by mass as a total concentration in terms of $TiO_2$+$SnO_2$.

Process (b): 11269 g of water and 211 g of 28% by mass aqueous ammonia were added to 2870 g of the basic titanium chloride-tin complex salt aqueous solution and the aqueous solution was diluted to a concentration of 5% by mass in terms of $TiO_2$+$SnO_2$. This aqueous solution was hydrolyzed at 95° C. for 10 hours to obtain agglomerate slurry of a titanium oxide-stannic oxide complex colloid.

Process (c): Excessive electrolyte was removed from the agglomerate slurry of the titanium oxide-stannic oxide complex colloid obtained in the process (b) by repeating operations of concentration and water pouring using about 15 liters of water in an ultrafiltration device, and thereafter, the slurry was deflocculated to obtain 14350 g of an acidic titanium oxide-stannic oxide complex water dispersion sol. A primary particle diameter of the titanium oxide-stannic oxide complex colloidal particles measured by transmission electron microscope observation was 4 nm to 8 nm, Process (d): 14350 g of the acidic titanium oxide-stannic oxide complex sol obtained in the process (c) was alkalified by adding 137 g of isopropylamine, and thereafter, excessive electrolyte was removed from the sol by repeating operations of concentration and water pouring using about 24 liter of water in an ultrafiltration device to obtain 14600 g of an alkaline titanium oxide-stannic oxide complex water dispersion sol. The alkaline water dispersion sol further was passed through a column packed with 200 milliliters of an anion-exchange resin (manufactured by ORGANO CORPORATION: Amberlite (registered trademark) IRA-410) to obtain 15500 g of an alkaline titanium oxide-stannic oxide complex water dispersion sol from which almost all anions were removed. The sol was concentrated with a rotary evaporator under reduced pressure to obtain 7 kg of a water dispersion sol of the titanium oxide-containing core particles (A1). At this time, a concentration was 10% by mass in terms of ($TiO_2$+$SnO_2$). A primary particle diameter of the titanium oxide-containing core particles (A1) measured by transmission electron microscope observation was 4 nm to 8 nm. The powder of the obtained sol dried at 110° C. was analyzed by X-ray diffraction analysis and was determined to be rutile type crystal.

Preparation Example 2

A water dispersion sol of titanium oxide-containing core particles (A2) was prepared based on Example 2 in Japanese Patent Application Publication No. H10-310429 (JP H10-310429 A).

Process (a): Into a 3-liter separable flask made of glass with a jacket, 587.5 g (159.8 g in terms of $TiO_2$) of titanium tetrachloride (27.2% by mass in terms of $TiO_2$, Cl 32.0% by mass, manufacture by Sumitomo Sitix Co., Ltd.), 114.6 g (49.2 g in terms of $ZrO_2$) of zirconium oxycarbonate and (43.0% by mass in terms of $ZrO_2$, manufactured by Daiichi Kigenso Kagaku Kogyo Co., Ltd), and 629.6 g of water were poured to prepare 1331.7 g of a mixed aqueous solution of titanium chloride and zirconium oxychloride (12.0% by mass in terms of $TiO_2$, 3.7% by mass in terms of $ZrO_2$). Stirred with a stirring bar made of glass, the aqueous solution was heated to 60° C., and thereafter, 358.0 g of 35% by mass hydrogen peroxide aqueous solution and 190.0 g of metal tin powder (manufactured by Yamaishi Metal Co., Ltd., trade name AT-Sn, No. 200) was added with cooling. The addition of the hydrogen peroxide aqueous solution and the metal tin powder was performed such that first 35.8 g (0.37 mol) of the hydrogen peroxide aqueous solution, and then 19.0 g (0.16 mol) of the metal tin were gradually added. After completion of the reaction that was waited for about 5 minutes to about 10 minutes, 35.8 g (0.37 mol) of the hydrogen peroxide, and then 19.0 g (0.16 mol) of the metal tin were gradually added. As described above, by repeating the addition of the hydrogen peroxide and the successive addition of the metal tin 10 times in total at 5 to 10-minute intervals, separation addition (35.8 of the hydrogen peroxide and 19.0 g of the metal tin were added 10 times) was carried out. The reaction was an exothermal reaction, and therefore, a temperature of the aqueous solution rose to 80° C. to 85° C. by the addition of the metal tin. After the reaction was completed, the aqueous solution was cooled to 60° C. to 70° C. The reaction was carried out at a temperature of 60° C. to 85° C. An addition ratio of the hydrogen peroxide and the metal tin was 2.31 in the molar ratio of $H_2O_2$/Sn. A required time for the addition of the hydrogen peroxide aqueous solution and the metal tin was 2.5 hours. Here, an adequate amount of water was added because water was evaporated by the reaction. After the reaction was completed, 1780 g of a basic titanium chloride-zirconium-tin complex salt aqueous solution which was clear light yellow was obtained. In the obtained basic titanium chloride-zirconium-tin complex salt aqueous solution, a titanium component was 8.98% by mass in terms of $TiO_2$, a zirconium component was 2.76% by mass in terms of $ZrO_2$, a tin component was 13.55% by mass in terms of $SnO_2$, the molar ratio of $ZrO_2/TiO_2$ was 0.2, and the molar ratio of $TiO_2/(ZrO_2+SnO_2)$ was 1.0. The molar ratio of (Ti+Zr+Sn)/Cl was 0.76.

Process (b): 259 g of 28% by mass aqueous ammonia and 6964 g of water were added to 1780 g of the basic titanium chloride-zirconium-tin complex salt aqueous solution obtained in the process (a) and the aqueous solution was diluted to a concentration of 5% by mass in terms of $TiO_2+ZrO_2+SnO_2$. This aqueous solution was hydrolyzed at 95° C. to 98° C. for 12 hours to obtain agglomerate slurry of titanium oxide-zirconium oxide-stannic oxide complex colloidal particles.

Process (c): Excessive electrolyte was removed from the agglomerate slurry of the titanium oxide-zirconium oxide-stannic oxide complex colloidal particles obtained in the process (b) by repeating operations of concentration and water pouring using about 20 liter of water in an ultrafiltration device, and thereafter, the slurry was deflocculated to obtain 8400 g of an acidic titanium oxide-zirconium oxide-stannic oxide complex colloidal particle water dispersion sol. A primary particle diameter of the titanium oxide-stannic oxide complex colloidal particles measured by transmission electron microscope observation was 4 nm to 8 nm.

Process (d): 9000 g of the acidic complex sol of the titanium oxide-zirconium oxide-stannic oxide colloidal particles obtained in the process (c) was alkalified by adding 27.0 g of isopropylamine, and thereafter, excessive electrolyte was removed from the complex sol by repeating operations of concentration and water pouring using about 20 liters of water in an ultrafiltration device to obtain 8000 g of an alkaline water dispersion sol of the titanium oxide-zirconium oxide-stannic oxide complex colloidal particles. This sol was passed through a column packed with 500 milliliters of an anion-exchange resin (manufactured by ORGANO CORPORATION: Amberlite (registered trademark) IRA-410) to obtain 9050 g of an alkaline water dispersion sol of the titanium oxide-zirconium oxide-stannic oxide complex colloidal particles from which almost all anions were removed. The sol was concentrated with an ultrafiltration device to obtain 3100 g of a concentrated water dispersion sol of the titanium oxide-zirconium oxide-stannic oxide complex colloidal particles. The obtained sol had a specific gravity of 1.140, a viscosity of 10.3 mPa·s, a pH of 10.31, a conductivity of 1105 μs/cm, a concentration of 5.18% by mass in terms of $TiO_2$, a concentration of 1.58% by mass in terms of $ZrO_2$, a concentration of 7.7% by mass in terms of $SnO_2$, and a primary particle diameter determined with a transmission electron microscope of 4 nm to 8 nm. The obtained titanium oxide-zirconium oxide-stannic oxide complex colloidal particles were defined as titanium oxide-containing core particles (A2). The powder of the obtained sol dried at 110° C. was analyzed by X-ray diffraction analysis and was determined to be a mixture of rutile type crystal and anatase type crystal.

Preparation Example 3

1169 g of pure water was poured into a 3-liter container and 151 g of oxalic acid dihydrate (manufactured by Ube Industries, Ltd.), 227 g of titanium tetraisopropoxide (a content of 64 g in terms of $TiO_2$, manufactured by KANTO CHEMICAL CO., INC.), and 582 g of 25% by mass tetramethylammonium hydroxide aqueous solution (manufactured by TAMA CHEMICALS CO., LTD.) were added with stirring. In the obtained mixed solution, the molar ratio of oxalic acid/titanium atom was 1.5 and the molar ratio of tetramethylammonium hydroxide/oxalic acid was 1.33. 2131 g of the mixed solution was maintained at 88° C. to 92° C. for 3 hours under atmospheric pressure in an open system and generated isopropanol as by-product was removed by distillation to prepare 1937 g of titanium containing aqueous solution. To the obtained titanium containing aqueous solution, 194 g of pure water was added to adjust a concentration of the titanium containing aqueous solution in terms of $TiO_2$ to 3.0% by mass. The titanium containing aqueous solution after adjusting the concentration had a pH of 4.7 and a conductivity of 31.4 mS/cm. To 3 L stainless autoclave container, 2131 g of the titanium containing aqueous solution was charged and hydrothermally treated at 140° C. for 5 hours. After the solution was cooled to room temperature, the taken out solution after the hydrothermal treatment was a highly transparent water dispersion sol of titanium oxide colloidal particles. The obtained sol had a specific gravity of 1.037, a pH of 3.8, a conductivity of 35.7 mS/cm, a concentration of $TiO_2$ of 3.0% by mass, a concentration of tetramethylammonium hydroxide of 6.8% by mass, a concentration of oxalic acid of 5.1% by mass, a particle diameter determined by a dynamic light scattering method (measured by N5 manufactured by Coulter Inc.) of 12 nm, and a viscosity of 3.2 mPa·s (measured by a B-type viscometer). In transmission electron microscope observation, substantially spherical particles having a primary particle diameter of 5 nm to 8 nm were observed. The powder of the obtained sol dried at 110° C. was analyzed by X-ray diffraction analysis and was determined to be anatase type crystal. The obtained titanium oxide colloidal particles were defined as titanium oxide-containing core particles (A3).

Preparation Example 4

A titanium oxide-containing core particle (A4) dispersion sol was prepared as follows. 197 g of pure water was poured into 2-liter container, and 269 g of a tin oxalate solution (a content of 75 g in terms of $SnO_2$ and 67 g in terms of oxalic acid), 142 g of titanium tetraisopropoxide (a content of 40 g in terms of $TiO_2$), 73 g of oxalic acid dihydrate (52 g in terms of oxalic acid), and 319 g of 25% by mass tetramethylammonium hydroxide aqueous solution were added with stirring. In the obtained mixed solution, the molar ratio of oxalic acid/titanium atom was 1.3 and the molar ratio of tetramethylammonium hydroxide/titanium atom was 1.75. 1000 g of the mixed solution was maintained at 80° C. for 2 hours and further maintained under reduced pressure of 580 Ton for 2 hours to prepare a titanium mixed solution. The titanium mixed solution after preparation had a pH of 5.1, a conductivity of 30.9 mS/cm, and a concentration of $TiO_2$ of 4.0% by mass. Into a 3-liter autoclave container having a glass lining, 1000 g of the titanium mixed solution was charged and hydrothermally treated at 140° C. for 5 hours. After the solution was cooled to room temperature, the taken out solution after the hydrothermal treatment was a light opaque white water dispersion sol of titanium oxide colloidal particles. The obtained sol had a pH of 3.9, a conductivity of 32.6 mS/cm, a concentration of $TiO_2$ of 4.0% by mass, a concentration of tetramethylammonium hydroxide of 8.0% by mass, a concentration of oxalic acid of 5.9% by mass, and a particle diameter determined by the dynamic light scattering method of 16 nm. In transmission electron microscope observation, elliptical particles having a primary particle diameter of 5 nm to 15 nm were observed. The powder of the obtained sol dried at 110° C. was analyzed by X-ray diffraction analysis and was determined to be rutile type crystal. The obtained titanium oxide colloidal particles were defined as titanium oxide-containing core particles (A4).

Preparation Example 5

35.6 kg of a potassium silicate aqueous solution (a content of 19.9% by mass as $SiO_2$, manufactured by Nissan Chemical Industries, Ltd.) was diluted with 330.0 kg of pure water, and thereafter, 18.1 kg of 48% by mass potassium hydroxide aqueous solution and 3.2 kg of antimony trioxide (a content of 99% by mass as $Sb_2O_3$, manufactured by Mikuni Seiren K.K.) were added and subsequently 2.2 kg of 35% by mass of hydrogen peroxide aqueous solution wad added with stirring, and the mixture was reacted at 93° C. for 1 hour to obtain a potassium silicate antimonate aqueous solution. 427.5 g of the obtained potassium silicate antimonate aqueous solution was diluted with 1 kg of pure water and the diluted solution was passed through a column packed with a hydrogen type cation exchange resin (Amberlite (registered trademark) IR-120B) to obtain 2703 g of a water dispersion sol of silicon dioxide-antimony pentoxide complex oxide colloidal particles (pH 2.1, 0.64% by mass as $Sb_2O_5$ and 1.26% by mass as $SiO_2$, a mass ratio of $SiO_2/Sb_2O_5$ of 2.0). Subsequently, 10.2 g of diisopropylamine was added to the obtained water dispersion sol. The obtained sol was an alkaline water dispersion sol of the silicon dioxide-antimony pentoxide complex oxide colloidal particles and a pH thereof was 8.2. In the obtained water dispersion sol, colloidal particles having a primary particle diameter of 5 nm or less was observed.

Preparation Example 6

77.2 g of JIS No. 3 sodium silicate (a content of 29.8% by mass as $SiO_2$, manufactured by Fuji Kagaku CORP.) was dissolved in 1282 g of pure water, and subsequently 20.9 g of sodium stannate $NaSnO_3 \cdot H_2O$ (a content of 55.1% by mass as $SnO_2$, manufactured by Showa Kako Corporation) was dissolved. The obtained aqueous solution was passed through a column packed with a hydrogen type cation exchange resin (Amberlite (registered trademark) IR-120B) to obtain 2634g of an acidic water dispersion sol of silicon dioxide-stannic oxide complex colloidal particles (B1) (pH 2.4, a content of 0.44% by mass as $Sn_2O$ and 0.87% by mass as $SiO_2$, a mass ratio of $SiO_2/SnO_2$ 2.0). Subsequently, 6.9 g of diisopropylamine was added to the obtained water dispersion sol. The obtained sol was an alkaline water dispersion sol of the silicon dioxide-stannic oxide complex colloidal particles (B1) and a pH thereof was 8.0. In the water dispersion sol, colloidal particles having a primary particle diameter of 5 nm or less were observed by a transmission electron microscope.

Example 1

70.8 g of zirconium oxychloride (a content of 21.19% by mass as $ZrO_2$, manufactured by Daiichi Kigenso Kagaku Kogyo Co., Ltd.) was diluted with 429.2 g of pure water to prepare 500 g of a zirconium oxychloride aqueous solution (a content of 3.0% by mass as $ZrO_2$), and 1000 g of the water dispersion sol of the titanium oxide-containing core particles (A1) prepared in Preparation Example 1 was added with stirring. Subsequently, the water dispersion sol was hydrolyzed by heating to 95° C. to obtain a water dispersion sol of the titanium oxide-containing core particles (A1) on the surface of which a thin film of zirconium oxide was formed. The obtained water dispersion sol had a pH of 1.2 and a total metal oxide concentration of 20% by mass. In transmission electron microscope observation, colloidal particles having a primary particle diameter of 4 nm to 8 nm were observed. 1455 g of the obtained water dispersion sol was added to 2634 g of the alkaline water dispersion sol of the silicon dioxide-stannic oxide complex colloidal particles (B1) prepared in Preparation Example 6 with stirring. Subsequently, the sol was passed through a column packed with 500 milliliters of an anion-exchange resin (Amberlite (registered trademark) IRA-410, manufactured by ORGANO CORPORATION). Subsequently, the water dispersion sol after passing through the column was heated at 95° C. for 3 hours and concentrated by an ultrafiltration membrane method to obtain a water dispersion sol of metal oxide particles containing titanium oxide coated with silicon dioxide-stannic oxide complex oxide in which an intermediate thin film layer made of zirconium oxide was formed between the titanium oxide-containing core particles (A1) and the silicon dioxide-stannic oxide complex colloidal particles (B1). The obtained water dispersion sol had a total metal oxide concentration of 20% by mass. In transmission electron microscope observation of the sol, a primary particle diameter was 4 nm to 10 nm. Subsequently, the dispersion medium of the obtained water dispersion sol was replaced with methanol by using a rotary evaporator to obtain a methanol dispersion sol of the metal oxide particles containing titanium oxide coated with silicon dioxide-stannic oxide complex oxide in which an intermediate thin film layer made of zirconium oxide was formed between the titanium oxide-containing core particles (A1) and the silicon dioxide-stannic oxide complex colloidal particles (B1). This methanol dispersion sol had a total metal oxide concentration of 30% by mass, a viscosity of 3.2 mPa·s, a particle diameter determined by a dynamic light scattering method (DLS particle diameter, measured by N4PULS manufactured by BECKMAN COULTER Inc.) of 32 nm, and a moisture content of 1.2% by mass.

Example 2

70.8 g of zirconium oxychloride (a content of 21.19% by mass as $ZrO_2$, manufactured by Daiichi Kigenso Kagaku Kogyo Co., Ltd.) was diluted with 429.2 g of pure water to prepare 500 g of a zirconium oxychloride aqueous solution (a content of 3.0% by mass as $ZrO_2$), and 1298.7 g of the water dispersion sol of the titanium oxide-containing core particles (A2) prepared in Preparation Example 2 was added with stirring. Subsequently, the water dispersion sol was hydrolyzed by heating to 95° C. to obtain a water dispersion sol of the titanium oxide-containing core particles (A2) on the surface of which a thin film of zirconium oxide was formed. The obtained water dispersion sol had a pH of 1.2 and a total metal oxide concentration of 20% by mass. In transmission electron microscope observation of this sol, colloidal particles having a primary particle diameter of 4 nm to 8 nm were observed. 1764 g of the obtained water dispersion sol was added to 2634 g of the alkaline water dispersion sol of the silicon dioxide-stannic oxide complex colloidal particles (B1) prepared in Preparation Example 6 with stirring. Subsequently, the sol was passed through a column packed with 500 milliliters of an anion-exchange resin (Amberlite (registered trademark) IRA-410, manufactured by ORGANO CORPORATION). Subsequently, the water dispersion sol after passing through the column was heated at 95° C. for 3 hours and concentrated by an ultrafiltration membrane method to obtain a water dispersion sol of metal oxide particles containing titanium oxide coated with silicon dioxide-stannic oxide complex oxide in which an intermediate thin film layer made of zirconium oxide was formed between the titanium oxide-containing core particles (A2) and the silicon dioxide-stannic oxide complex colloidal particles (B1). The obtained water dispersion sol had a total metal oxide concentration of 20% by mass. In transmission electron microscope observation of the sol, a primary particle diameter was 4 nm to 10 nm. Subsequently, the dispersion medium of the obtained water dispersion sol was replaced with methanol by using a rotary evaporator to obtain a methanol dispersion sol of the metal oxide particles containing titanium oxide coated with silicon dioxide-stannic oxide complex oxide in which an intermediate thin film layer made of zirconium oxide was formed between the titanium oxide-containing core particles (A2) and the silicon dioxide-stannic oxide complex colloidal particles (B1). This methanol dispersion sol had as total metal oxide concentration of 30% by mass, a viscosity of 3.2 mPa·s, a DLS particle diameter of 36 nm, and a moisture content of 1.5% by mass.

Example 3

35.8 g of zirconium oxychloride (a content of 21.19% by mass as $ZrO_2$, manufactured by Daiichi Kigenso Kagaku Kogyo Co., Ltd.) was diluted with 217 g of pure water to prepare 253 g of a zirconium oxychloride aqueous solution (a content of 3.0% by mass as $ZrO_2$), and 1331 g of the water dispersion sol of the titanium oxide-containing core particles (A3) prepared in Preparation Example 3 was added with stirring. Subsequently, the water dispersion sol was hydrolyzed by heating to 95° C. to obtain a water dispersion sol of the titanium oxide-containing core particles (A3) on the surface of which a thin film of zirconium oxide was formed. The obtained water dispersion sol had a pH of 1.2 and a total metal oxide concentration of 20% by mass. In transmission electron microscope observation of this sol, colloidal particles having a primary particle diameter of 4 nm to 8 nm were observed. The obtained water dispersion sol was added to 1090 g of the alkaline water dispersion sol of the silicon dioxide-stannic oxide complex colloidal particles (B1) prepared in Preparation Example 6 with stirring. Subsequently, the sol was passed through a column packed with 500 milliliters of an anion-exchange resin (Amberlite (registered trademark) IRA-410, manufactured by ORGANO CORPORATION). Subsequently, the water dispersion sol after passing through the column was heated at 150° C. for 3 hours and concentrated by an ultrafiltration membrane method to obtain a water dispersion sol of metal oxide particles containing titanium oxide coated with silicon dioxide-stannic oxide complex oxide in which an intermediate thin film layer made of zirconium oxide was formed between the titanium oxide-containing core particles (A3) and the silicon dioxide-stannic oxide complex colloidal particles (B1). The obtained water dispersion sol had a total metal oxide concentration of 20% by mass. In transmission electron microscope observation of the sol, a primary particle diameter was 5 nm to 10 nm. Subsequently, the dispersion medium of the obtained water dispersion sol was replaced with methanol by using a rotary evaporator to obtain a methanol dispersion sol of the metal oxide particles containing titanium oxide coated with silicon dioxide-stannic oxide complex oxide in which an intermediate thin film layer made of zirconium oxide was formed between the titanium oxide-containing core particles (A3) and the silicon dioxide-stannic oxide complex colloidal particles (B1). This methanol dispersion sol had a total metal oxide concentration of 30% by mass, a viscosity of 2.2 mPa·s, a DLS particle diameter of 22 nm, and a moisture content of 1.0% by mass.

Example 4

35.9 g of zirconium oxychloride (a content of 21.19% by mass as $ZrO_2$, manufactured by Daiichi Kigenso Kagaku Kogyo Co., Ltd.) was diluted with 217 g of pure water to prepare 253 g of a zirconium oxychloride aqueous solution (a content of 3.0% by mass as $ZrO_2$), and 1000 g of the water dispersion sol of the titanium oxide-containing core particles (A4) prepared in Preparation Example 4 was added with stirring. Subsequently, the water dispersion sol was hydrolyzed by heating to 95° C. to obtain a water dispersion sol of the titanium oxide-containing core particles (A4) on the surface of which a thin film of zirconium oxide was formed. The obtained water dispersion sol had a pH of 1.2 and a total metal oxide concentration of 20% by mass. In transmission electron microscope observation of this sol, colloidal particles having a primary particle diameter of 5 nm to 15 nm were observed. 1231 g of the obtained water dispersion sol was added to 1090 g of the alkaline water dispersion sol of the silicon dioxide-stannic oxide complex colloidal particles (B1) prepared in Preparation Example 6 with stirring. Subsequently, the sol was passed through a column packed with 500 milliliters of an anion-exchange resin (Amberlite (registered trademark) IRA-410, manufactured by ORGANO CORPORATION). Subsequently, the water dispersion sol after passing through the column was heated at 150° C. for 3 hours to obtain a water dispersion sol of metal oxide particles containing titanium oxide coated with silicon dioxide-stannic oxide complex oxide in which an intermediate thin film layer made of zirconium oxide was formed between the titanium oxide-containing core particles (A4) and the silicon dioxide-stannic oxide complex colloidal particles (B 1). The obtained water dispersion sol was 2877 g and had a total metal oxide concentration of 2.1% by mass. In transmission electron microscope observation of the sol, a primary particle diameter was 5 nm to 18 nm. Further, the dispersion medium of the obtained water dispersion sol was replaced with methanol by using a rotary evaporator to obtain a methanol dispersion sol of the metal oxide particles containing titanium oxide coated with silicon dioxide-stannic oxide complex oxide in which an intermediate thin film layer made of zirconium oxide was formed between the titanium oxide-containing core particles (A1) and the silicon dioxide-stannic oxide complex colloidal particles (B 1). This methanol dispersion sol had a concentration of 30% by mass, a viscosity of 2.0 mPa·s, a DLS particle diameter of 24 nm, and a moisture content of 0.9% by mass.

Example 5

A water dispersion sol of metal oxide particles containing titanium oxide coated with silicon dioxide-stannic oxide complex oxide in which an intermediate thin film layer made of silicon dioxide-antimony pentoxide complex oxide was formed between the titanium oxide-containing core particles (A1) and the silicon dioxide-stannic oxide complex colloidal particles (B1) was obtained in a similar manner to Example 1, except that 1211 g of the water dispersion sol of the silicon dioxide-antimony pentoxide complex oxide colloidal particles prepared in Preparation Example 5 was used instead of 500 g of the zirconium oxychloride aqueous solution. Further, the dispersion medium of the obtained water dispersion sol was replaced with methanol by using a rotary evaporator to obtain a methanol dispersion sol of the metal oxide particles containing titanium oxide coated with silicon dioxide-stannic oxide complex oxide in which an intermediate thin film layer made of silicon dioxide-antimony pentoxide complex oxide was formed between the titanium oxide-containing core particles (A1) and the silicon dioxide-stannic oxide complex colloidal particles (B1). The obtained methanol dispersion sol had a concentration of 30% by mass, a viscosity of 3.1 mPa·s, a DLS particle diameter of 32 nm, and a moisture content of 1.1% by mass.

Example 6

A water dispersion sol of metal oxide particles containing titanium oxide coated with silicon dioxide-stannic oxide complex oxide in which an intermediate thin film layer made of silicon dioxide-antimony pentoxide complex oxide was formed between the titanium oxide-containing core particles (A2) and the silicon dioxide-stannic oxide complex colloidal particles (B1) was obtained in a similar manner to Example 2, except that 1211 g of the water dispersion sol of the silicon dioxide-antimony pentoxide complex oxide colloidal particles prepared in Preparation Example 5 was used instead of 500 g of the zirconium oxychloride aqueous solution. Further, the dispersion medium of the obtained water dispersion sol was replaced with methanol by using a rotary evaporator to obtain a methanol dispersion sol of the metal oxide particles containing titanium oxide coated with silicon dioxide-stannic oxide complex oxide in which an intermediate thin film layer made of silicon dioxide-antimony pentoxide complex oxide was formed between the titanium oxide-containing core particles (A2) and the silicon dioxide-stannic oxide complex colloidal particles (B1). The obtained methanol dispersion sol had a concentration of 30% by mass, a viscosity of 3.3 mPa·s, a DLS particle diameter of 35 nm, and a moisture content of 2.0% by mass.

Example 7

A water dispersion sol of metal oxide particles containing titanium oxide coated with silicon dioxide-stannic oxide complex oxide in which an intermediate thin film layer made of silicon dioxide-antimony pentoxide complex oxide was formed between the titanium oxide-containing core particles (A3) and the silicon dioxide-stannic oxide complex colloidal particles (B1) was obtained in a similar manner to Example 3, except that 653 g of the water dispersion sol of the silicon dioxide-antimony pentoxide complex oxide colloidal particles prepared in Preparation Example 5 was used instead of 253 g of the zirconium oxychloride aqueous solution. Further, the dispersion medium of the obtained water dispersion sol was replaced with methanol by using a rotary evaporator to obtain a methanol dispersion sol of the metal oxide particles containing titanium oxide coated with silicon dioxide-stannic oxide complex oxide in which an intermediate thin film layer made of silicon dioxide-antimony pentoxide complex oxide was formed between the titanium oxide-containing core particles (A3) and the silicon dioxide-stannic oxide complex colloidal particles (B1). The obtained methanol dispersion sol had a concentration of 30% by mass, a viscosity of 1.6 mPa·s, a DLS particle diameter of 18 nm, and a moisture content of 1.1% by mass.

Example 8

A water dispersion sol of metal oxide particles containing titanium oxide coated with silicon dioxide-stannic oxide complex oxide in which an intermediate thin film layer made of silicon dioxide-antimony pentoxide complex oxide was formed between the titanium oxide-containing core particles (A4) and the silicon dioxide-stannic oxide complex colloidal particles (B1) was obtained in a similar manner to Example 3, except that 653 g of the water dispersion sol of the silicon dioxide-antimony pentoxide complex oxide colloidal particles prepared in Preparation Example 5 was used instead of 253 g of the zirconium oxychloride aqueous solution. Further, the dispersion medium of the obtained water dispersion sol was replaced with methanol by using a rotary evaporator to obtain a methanol dispersion sol of the metal oxide particles containing titanium oxide coated with silicon dioxide-stannic oxide complex oxide in which an intermediate thin film layer made of silicon dioxide-antimony pentoxide complex oxide was formed between the titanium oxide-containing core particles (A4) and the silicon dioxide-stannic oxide complex colloidal particles (B1). The obtained methanol dispersion sol had a concentration of 30% by mass, a viscosity of 2.4 mPa·s, a DLS particle diameter of 21 nm, and a moisture content of 1.3% by mass.

Comparative Example 1

1150 g of the water dispersion sol of the titanium oxide-containing core particles (A1) prepared in Preparation Example 1 was added to 2634 g of the alkaline water dispersion sol of the silicon dioxide-stannic oxide complex colloidal particles (B1) prepared in Preparation Example 6 with stirring. Subsequently, the sol was passed through a column packed with 500 milliliters of an anion-exchange resin (Amberlite (registered trademark) IRA-410, manufactured by ORGANO CORPORATION). Subsequently, the water dispersion sol after passing through the column was heated at 95° C. for 3 hours and concentrated by an ultrafiltration membrane method to obtain a water dispersion sol of metal oxide particles containing titanium oxide coated with silicon dioxide-stannic oxide complex oxide made of the titanium oxide-containing core particles (A1) and a coating layer made of the silicon dioxide-stannic oxide complex colloidal particles (B1). The obtained water dispersion sol had a total metal oxide concentration of 16.5% by mass. In transmission electron microscope observation of the sol, a primary particle diameter was 4 nm to 10 nm. Further, the dispersion medium of the obtained water dispersion sol was replaced with methanol by using a rotary evaporator to obtain a methanol dispersion sol of the metal oxide particles containing titanium oxide coated with silicon dioxide-stannic oxide complex oxide made of the titanium oxide-containing core particles (A1) and a coating layer made of the silicon dioxide-stannic oxide complex colloidal particles (B1). The obtained methanol dispersion sol had a concentration of 30% by mass, a viscosity of 3.8 mPa·s, a DLS particle diameter of 41 nm, and a moisture content of 0.9% by mass.

Comparative Example 2

A water dispersion sol of metal oxide particles containing titanium oxide coated with silicon dioxide-antimony pentoxide complex oxide in which an intermediate thin film layer made of zirconium oxide was formed between the titanium oxide-containing core particles (A2) and the silicon dioxide-antimony pentoxide complex oxide colloidal particles was obtained in a similar manner to Example 2, except that 747 g of the alkaline water dispersion sol of the silicon dioxide-antimony pentoxide complex oxide colloidal particles prepared in Preparation Example 5 was used instead of 1090 g of the alkaline water dispersion sol of the silicon dioxide-stannic oxide complex colloidal particles (B 1) prepared in Preparation Example 6. In transmission electron microscope observation of the sol, a primary particle diameter was 4 nm to 10 nm. Further, the dispersion medium of the obtained water dispersion sol was replaced with methanol by using a rotary evaporator to obtain a methanol dispersion sol of the metal oxide particles containing titanium oxide coated with silicon dioxide-antimony pentoxide complex oxide in which an intermediate thin film layer made of zirconium oxide was formed between the titanium oxide-containing core particles (A2) and the silicon dioxide-antimony pentoxide complex oxide colloidal particles. The obtained methanol dispersion sol had a concentration of 30% by mass, a viscosity of 3.4 mPa·s, a DLS particle diameter of 44 nm, and a moisture content of 0.7% by mass.

Comparative Example 3

1666 g of the water dispersion sol of the titanium oxide-containing core particles (A3) prepared in Preparation Example 3 was added to 1317 g of the alkaline water dispersion sol of the silicon dioxide-stannic oxide complex colloidal particles (B 1) prepared in Preparation Example 6 with stirring. Subsequently, the sol was passed through a column packed with 500 milliliters of an anion-exchange resin (Amberlite (registered trademark) IRA-410, manufactured by ORGANO CORPORATION). Subsequently, the water dispersion sol after passing through the column was heated at 95° C. for 3 hours and concentrated by an ultrafiltration membrane method to obtain a water dispersion sol of metal oxide particles containing titanium oxide coated with silicon dioxide-stannic oxide complex oxide made of the titanium oxide-containing core particles (A3) and a coating layer made of the silicon dioxide-stannic oxide complex colloidal particles (B1). The obtained water dispersion sol had a total metal oxide concentration of 16.8% by mass. In transmission electron microscope observation of the sol, a primary particle diameter was 5 nm to 10 nm. Further, the dispersion medium of the obtained water dispersion sol was replaced with methanol by using a rotary evaporator to obtain a methanol dispersion sol of the metal oxide particles containing titanium oxide coated with silicon dioxide-stannic oxide complex oxide made of the titanium oxide-containing core particles (A3) and a coating layer made of the silicon dioxide-stannic oxide complex colloidal particles (B1). The obtained methanol dispersion sol had a concentration of 30% by mass, a viscosity of 1.6 mPa·s, a DLS particle diameter of 13 nm, and a moisture content of 2.5% by mass.

Comparative Example 4

A water dispersion sol of metal oxide particles containing titanium oxide coated with silicon dioxide-antimony pentoxide complex oxide in which an intermediate thin film layer made of zirconium oxide was formed between the titanium oxide-containing core particles (A4) and the silicon dioxide-antimony pentoxide complex oxide colloidal particles was obtained in a similar manner to Example 4, except that 747 g of the alkaline water dispersion sol of the silicon dioxide-antimony pentoxide complex oxide colloidal particles prepared in Preparation Example 5 was used instead of 1090 g of the alkaline water dispersion sol of the silicon dioxide-stannic oxide complex colloidal particles (B 1) prepared in Preparation Example 6. In transmission electron microscope observation of the sol, a primary particle diameter was 5 nm to 18 nm. Further, the dispersion medium of the obtained water dispersion sol was replaced with methanol by using a rotary evaporator to obtain a methanol dispersion sol of the metal oxide particles containing titanium oxide coated with silicon dioxide-antimony pentoxide complex oxide in which an intermediate thin film layer made of zirconium oxide was formed between the titanium oxide-containing core particles (A4) and the silicon dioxide-antimony pentoxide complex oxide colloidal particles. The obtained methanol dispersion sol had a concentration of 30% by mass, a viscosity of 2.1 mPa·s, a DLS particle diameter of 18 nm, and a moisture content of 1.7% by mass.

Example 9

To a container made of glass and equipped with a magnetic stirrer, 55.8 parts by mass of γ-glycidoxypropyltrimethoxysilane was added, and then 19.5 parts by mass of 0.01 N hydrochloric acid was added dropwise over 3 hours with stirring. After the dropwise addition, the mixture was stirred for 0.5 hours to obtain a partially hydrolysate of γ-glycidoxypropyltrimethoxysilane. Subsequently, to 75.3 parts by mass of the partially hydrolysate of y-glycidoxypropyltrimethoxysilane, 151.0 parts by mass of the methanol dispersion sol of the metal oxide particles containing titanium oxide coated with silicon dioxide-stannic oxide complex oxide in which the intermediate thin film layer made of zirconium oxide was formed between the titanium oxide-containing core particles (A1) and the silicon dioxide-stannic oxide complex colloidal particles (B1) (a content of 30% by mass in terms of the total metal oxide) obtained in Example 1, 65 parts by mass of butyl cellosolve, and further 0.9 parts by mass of aluminum acetylacetonate as a curing agent were added and the mixture was sufficiently stirred. Thereafter, the mixture was filtered to prepare a coating liquid for forming a transparent coating film. 151.0 parts by mass of a commercially available water dispersed emulsion polyurethane (SUPERFLEX (registered trademark) 170, manufactured by Dai-ichi Kogyo Seiyaku Co., Ltd., a solid content concentration of 30% by mass) and 74 parts by mass of pure water were mixed to prepare a coating liquid for a foundation layer.
(Formation of Cured Film)

A commercially available polycarbonate plate having a refractive index of $n_D$=1.59 was prepared, and first the coating composition for a foundation layer was applied by a spin coating method and the applied composition was treated by heating at 100° C. for 30 minutes to form a coating film. Further, the coating liquid for forming a transparent coating film wad applied and the applied coating liquid was subjected to heat treatment at 120° C. for 2 hours to cure the coating film. Evaluation results are shown in Table 1.

Example 10

Preparation was carried out in a similar manner to Example 10, except that 151.5 parts by mass of the methanol dispersion sol of the metal oxide particles containing titanium oxide coated with silicon dioxide-stannic oxide complex oxide (a content of 30% by mass in terms of the total metal oxide) in which the intermediate thin film layer made of zirconium oxide was formed between the titanium oxide-containing core particles (A2) and the silicon dioxide-stannic oxide complex colloidal particles (B 1) obtained in Example 2 was used. Evaluation results are shown in Table 1.

Example 11

Preparation was carried out in a similar manner to Example 10, except that 151 parts by mass of the methanol dispersion sol of the metal oxide particles containing titanium oxide coated with silicon dioxide-stannic oxide complex oxide (a content of 30% by mass in terms of the total metal oxide) in which the intermediate thin film layer made of zirconium oxide was formed between the titanium oxide-containing core particles (A3) and the silicon dioxide-stannic oxide complex colloidal particles (B 1) obtained in Example 3 was used. Evaluation results are shown in Table 1.

Example 12

A water dispersion sol of the metal oxide particles containing titanium oxide coated with silicon dioxide-stannic oxide complex oxide in which the intermediate thin film layer made of zirconium oxide was formed between the titanium oxide-containing core particles (A4) and the silicon dioxide-stannic oxide complex colloidal particles (B1) was obtained. Preparation was carried out in a similar manner to Example 10, except that 151 parts by mass of the obtained dispersion sol (a content of 30% by mass in terms of the total metal oxide) was used. Evaluation results are shown in Table 1.

Example 13

Preparation was carried out in a similar manner to Example 10, except that 151 parts by mass of the water dispersion sol of the metal oxide particles containing titanium oxide coated with silicon dioxide-stannic oxide complex oxide in which the intermediate thin film layer made of silicon dioxide-antimony pentoxide complex oxide was formed between the titanium oxide-containing core particles (A1) and the silicon dioxide-stannic oxide complex colloidal particles (B1) (a content of 30% by mass in terms of the total metal oxide) obtained in Example 5 was used. Evaluation results are shown in Table 1.

Example 14

Preparation was carried out in a similar manner to Example 10, except that 151 parts by mass of the water dispersion sol of the metal oxide particles containing titanium oxide coated with silicon dioxide-stannic oxide complex oxide in which the intermediate thin film layer made of silicon dioxide-antimony pentoxide complex oxide was formed between the titanium oxide-containing core particles (A2) and the silicon dioxide-stannic oxide complex colloidal particles (B1) (a content of 30% by mass in terms of the total metal oxide) obtained in Example 6 was used.

Example 15

Preparation was carried out in a similar manner to Example 10, except that 151 parts by mass of the water dispersion sol of the metal oxide particles containing titanium oxide coated with silicon dioxide-stannic oxide complex oxide in which the intermediate thin film layer made of silicon dioxide-antimony pentoxide complex oxide was formed between the titanium oxide-containing core particles (A3) and the silicon dioxide-stannic oxide complex colloidal particles (B1) (a content of 30% by mass in terms of the total metal oxide) obtained in Example 7 was used. Evaluation results are shown in Table 1.

Example 16

Preparation was carried out in a similar manner to Example 10, except that 151 parts by mass of the water dispersion sol of the metal oxide particles containing titanium oxide coated with silicon dioxide-stannic oxide complex oxide in which the intermediate thin film layer made of silicon dioxide-antimony pentoxide complex oxide was formed between the titanium oxide-containing core particles (A4) and the silicon dioxide-stannic oxide complex colloidal particles (B1) (a content of 30% by mass in terms of the total metal oxide) obtained in Example 8 was used. Evaluation results are shown in Table 1.

Comparative Example 5

Preparation was carried out using the sol prepared in Comparative Example 1 instead of the sol used in Example 10. Evaluation results are shown in Table 1.

Comparative Example 6

Preparation was carried out using the sol prepared in Comparative Example 2 instead of the sol used in Example 10. Evaluation results are shown in Table 1.

Comparative Example 7

Preparation was carried out using the sol prepared in Comparative Example 3 instead of the sol used in Example 10. Evaluation results are shown in Table 1.

Comparative Example 8

Preparation was carried out using the sol prepared in Comparative Example 4 instead of the sol used in Example 10. Evaluation results are shown in Table 1.
Various properties of optical members having a cured film obtained in Examples and Comparative Examples were measured by the following measurement methods.
(1) Weatherability Test
Exposure to the obtained optical members was carried out under a high-pressure mercury lamp (manufactured by ORC MANUFACTURING CO., LTD., UV-800) for 100 hours. Change in appearance of the optical members after exposure was visually determined.
A: No change in color at all
B: Almost no change in color
C: Extreme change in color
(2) Crack Resistance Test
Appearance of the test specimens used in the light stability test (1) was visually observed and determined.
A: No crack generation
B: Almost no crack generation
C: Slight crack generation
D: Crack generation in entire surface
(3) Scratch Resistance Test
The surface of the cured film was scratched with a steel wool No. 0000 and difficulty of scratch generation was visually determined. Criteria are as follows.
A: No scratches are observed
B: Slight scratches are observed
C: Many of remarkable scratches are observed
(4) Transparency Test
In a dark room, whether cloudiness in the cured film exists or not was visually determined under fluorescent light. Criteria are as follows.
A: Almost no cloudiness is generated
B: Cloudiness is generated but does not cause problem as the transparent cured film
C: Remarkable whitening is generated
(5) Long Term Stability Test
Each coating liquid for forming a transparent coating film prepared in Examples 9 to 16 and Comparative Examples 5 to 8 was stored at 10° C. for 60 days, and thereafter, transparent coating films were formed in similar manners to Examples 9 to 16 and Comparative Examples 5 to 8 and the weatherability test (1) of the transparent coating films was carried out. Deference between the transparent coating film formed just after preparing the coating liquid for forming a transparent coating film and the transparent coating film formed from the coating liquid after storing at 10° C. at 60 days was evaluated in three steps of A, B, and C.
A: No difference is observed
B: Slight decrease in performance is observed
C: Obvious decrease in performance is observed

TABLE 1

|  | Example 1 | Example 2 | Example 3 | Example 4 | Example 5 | Example 6 |
|---|---|---|---|---|---|---|
| Core particles (A) | $TiO_2$—$SnO_2$ | $TiO_2$—$ZrO_2$—$SnO_2$ | $TiO_2$ | $TiO_2$ | $TiO_2$—$SnO_2$ | $TiO_2$—$ZrO_2$—$SnO_2$ |
| Intermediate layer | $ZrO_2$ | $ZrO_2$ | $ZrO_2$ | $ZrO_2$ | $Sb_2O_5$—$SiO_2$ | $Sb_2O_5$—$SiO_2$ |
| Coating layer (B) | $SnO_2$—$SiO_2$ | $SnO_2$—$SiO_2$ | $SnO_2$—$SiO_2$ | $SnO_2$—$SiO_2$ | $SnO_2$—$SiO_2$ | $SnO_2$—$SiO_2$ |
| $TiO_2$ in core particles (A) (% by mass) | 10.5 | 39.9 | 100 | 100 | 10.5 | 39.9 |
| (B)/(A) (% by mass) | 34.5 | 34.5 | 35.8 | 35.7 | 34.5 | 34.5 |
| Crystal type of core particles (A) | Rutile | Rutile/Anatase | Anatase | Rutile | Rutile | Rutile/Anatase |
| Primary particle diameter (nm) | 4-10 | 4-10 | 5-10 | 5-18 | 4-10 | 4-10 |

| Evaluation result | Example 9 | Example 10 | Example 11 | Example 12 | Example 13 | Example 14 |
|---|---|---|---|---|---|---|
| Weatherability | A | A | A | A | A | A |
| Crack resistance | A | A | A | A | A | A |
| Scratch resistance | A | A | A | A | A | A |
| Transparency | A | A | A | A | A | A |
| Long term stability | A | A | A | A | A | A |

|  | Example 7 | Example 8 | Comparative Example 1 | Comparative Example 2 | Comparative Example 3 | Comparative Example 4 |
|---|---|---|---|---|---|---|
| Core particles (A) | $TiO_2$ | $TiO_2$ | $TiO_2$—$SnO_2$ | $TiO_2$—$ZrO_2$—$SnO_2$ | $TiO_2$ | $TiO_2$ |
| Intermediate layer | $Sb_2O_5$—$SiO_2$ | $Sb_2O_5$—$SiO_2$ | None | $ZrO_2$ | None | $ZrO_2$ |
| Coating layer (B) | $SnO_2$—$SiO_2$ | $SnO_2$—$SiO_2$ | $SnO_2$—$SiO_2$ | $Sb_2O_5$—$SiO_2$ | $SnO_2$—$SiO_2$ | $Sb_2O_5$—$SiO_2$ |

TABLE 1-continued

|  | Example 15 | Example 16 | Comparative Example 5 | Comparative Example 6 | Comparative Example 7 | Comparative Example 8 |
|---|---|---|---|---|---|---|
| TiO$_2$ in core particles (A)(% by mass) | 100 | 100 | 10.5 | 39.9 | 100 | 100 |
| (B)/(A) (% by mass) | 35.8 | 35.7 | 34.5 | 34.5 | 35.8 | 35.7 |
| Crystal type of core particles (A) | Anatase | Rutile | Rutile | Rutile/Anatase | Anatase | Rutile |
| Primary particle diameter (nm) | 5-10 | 5-18 | 4-10 | 4-10 | 5-10 | 5-18 |

| Evaluation result | Example 15 | Example 16 | Comparative Example 5 | Comparative Example 6 | Comparative Example 7 | Comparative Example 8 |
|---|---|---|---|---|---|---|
| Weatherability | A | A | B | A | C | B |
| Crack resistance | A | A | B | C | C | A |
| Scratch resistance | A | A | A | C | A | C |
| Transparency | A | A | A | A | A | A |
| Long term stability | A | A | B | A | B | A |

Examples of 1 to 8 of the present invention showed excellent scratch resistance, adhesion, transparency, and weatherability. Comparative Examples 1 to 4 showed insufficient scratch resistance, transparency, and weatherability.

The invention claimed is:

1. A substrate coated with a transparent coating film comprising:
   a substrate; and
   a transparent coating film formed on a surface of the substrate by using a coating liquid for forming a transparent coating film comprising:
   metal oxide particles;
   one or more hydrolysate or partial condensate of a tetrafunctional organic silicon compound of General Formula (5):

   $$Si(OR^4)_4 \quad (5)$$

wherein R4 is a C1-8 hydrocarbon group, an alkoxyalkyl group or an acyl group,
   a matrix formation component; and
   at least one curing catalyst selected from the group consisting of amines, amino acids, and metal acetylacetonates,
   wherein the metal oxide particles each include a metal oxide particle containing titanium oxide coated with silicon dioxide-stannic oxide complex oxide comprising:
   a titanium oxide-containing core particle (A); and
   a coating layer with which the titanium oxide-containing core particle (A) is coated and that is made of silicon dioxide-stannic oxide complex oxide colloidal particles (B) having a mass ratio of silicon dioxide/stannic oxide of 0.1 to 5.0,
   wherein one or more intermediate thin film layers that are made of an oxide of Zr or a complex oxide of Si and Sb are interposed between the titanium oxide-containing core particle (A) and the coating layer made of the silicon dioxide-stannic oxide complex oxide colloidal particles (B),
   wherein a ratio of the coating layers made of the silicon dioxide-stannic oxide complex oxide colloidal particles (B) to the titanium oxide-containing core particles (A) is in a range of 0.345 to 0.358, and
   wherein an organic silicon compound or an amine-based compound is bonded to a surface of the metal oxide particles containing titanium oxide coated with silicon dioxide-stannic oxide complex oxide in an amount of 0.1% by mass to 40% by mass relative to a mass of the metal oxide particles containing titanium oxide coated with silicon dioxide-stannic oxide complex oxide colloidal particles.

2. The substrate coated with a transparent coating film according to claim 1, wherein the matrix formation component is selected from the group consisting of:
   (i) a matrix formation component including at least one selected from the group consisting of an organic silicon compound of Formula (I):

   $$R^1_a R^2_b Si(OR^3)_{4-(a+b)} \quad (I),$$

a hydrolysate of the organic silicon compound, and a partial condensate of the hydrolysate,
   where R$^1$ is a C$_{1-10}$ hydrocarbon group, a vinyl group, a methacryloxy group, or an organic group containing a mercapto group, an amino group, or an epoxy group; R$^2$ is a C$_{1-4}$ hydrocarbon group; R$^3$ is a C$_{1-8}$ hydrocarbon group or an acyl group; and a and b are each 0 or 1;
   (ii) a matrix formation component including at least one resin selected from the group consisting of a thermosetting resin, a thermoplastic resin, and an ultraviolet curing resin; and
   (iii) a polyester-based resin or a urethane-based resin.

3. The substrate coated with a transparent coating film according to claim 2, wherein
   the matrix formation component includes at least one selected from the group consisting of an organic silicon compound of Formula (I):

   $$R^1_a R^2_b Si(OR^3)_{4-(a+b)} \quad (I),$$

a hydrolysate of the organic silicon compound, and a partial condensate of the hydrolysate,
   where R$^1$ is a C$_{1-10}$ hydrocarbon group, a vinyl group, a methacryloxy group, or an organic group containing a mercapto group, an amino group, or an epoxy group; R$^2$ is a C$_{1-4}$ hydrocarbon group; R$^3$ is a C$_{1-8}$ hydrocarbon group or an acyl group; and a and b are each 0 or 1.

4. The substrate coated with a transparent coating film according to claim 2, wherein
   the matrix formation component includes at least one resin selected from the group consisting of a thermosetting resin, a thermoplastic resin, and an ultraviolet curing resin.

5. The substrate coated with a transparent coating film according to claim 2, wherein
   the matrix formation component is a polyester-based resin or a urethane-based resin.

6. The substrate coated with a transparent coating film according to claim 2, wherein
a titanium oxide content in the titanium oxide-containing core particle (A) is 5% by mass to 100% by mass in terms of $TiO_2$, and an amount of the coating layer made of the silicon dioxide-stannic oxide complex oxide colloidal particles (B) to a mass of the titanium oxide-containing core particle (A) is in a range of 0.01 to 1.0.

7. The substrate coated with a transparent coating film according to claim 2, wherein
the titanium oxide-containing core particle (A) includes at least one element selected from the group consisting of Si, Al, Sn, Zr, Zn, Sb, Nb, Ta, and W.

8. The substrate coated with a transparent coating film according to claim 2, wherein
a crystal type of the titanium oxide-containing core particle (A) is a rutile type.

9. The substrate coated with a transparent coating film according to claim 2, further comprising:
an anti-reflective coating on the transparent coating film.

10. The substrate coated with a transparent coating film according to claim 1, wherein the one or more intermediate thin film layers is made of $ZrO_2$.

11. The substrate coated with a transparent coating film according to claim 1, wherein the one or more intermediate thin film layers is made of $Sb_2O_5$-$SiO_2$.

12. The substrate coated with a transparent coating film according to claim 1, wherein the substrate has a refractive index of $n_D$=1.59 or more, and the transparent coating film does not cause cloudiness and has transparency when applied to the substrate.

13. The substrate coated with a transparent coating film according to claim 1, wherein the transparent coating film does not change in color after 100 hours of exposure under a high-pressure mercury lamp.

* * * * *